(12) United States Patent
Yoshihito et al.

(10) Patent No.: US 11,934,016 B2
(45) Date of Patent: Mar. 19, 2024

(54) OPTICAL ADAPTER HOLDING STRUCTURE, OPTICAL ADAPTER, METHOD FOR PLUGGING AND UNPLUGGING OPTICAL CONNECTOR, AND METHOD FOR CHECKING BENDING RADIUS OF OPTICAL CABLE

(71) Applicant: Shoden Seiwa Co., Ltd., Tokyo (JP)

(72) Inventors: Tamakawa Yoshihito, Tokyo (JP); Muthukumarana Wedikkara Arachchilage Chanaka Sudheera, Tokyo (JP)

(73) Assignee: Shoden Seiwa Co., Ltd., Tokyo (JP)

( * ) Notice: Subject to any disclaimer, the term of this patent is extended or adjusted under 35 U.S.C. 154(b) by 0 days.

(21) Appl. No.: 17/745,297

(22) Filed: May 16, 2022

(65) Prior Publication Data

US 2023/0367080 A1 Nov. 16, 2023

(51) Int. Cl.
   *G02B 6/38* (2006.01)
(52) U.S. Cl.
   CPC ......... *G02B 6/3825* (2013.01); *G02B 6/3886* (2013.01); *G02B 6/3898* (2013.01)
(58) Field of Classification Search
   CPC .......................... G02B 6/3898; G02B 6/3886
   See application file for complete search history.

(56) References Cited

U.S. PATENT DOCUMENTS

| | | |
|---|---|---|
| 10,725,250 B1 | 7/2020 | Leigh et al. |
| 2003/0048999 A1 | 3/2003 | Imabayashi et al. |
| 2005/0112939 A1 | 5/2005 | Grzegorzewska et al. |
| 2014/0064664 A1* | 3/2014 | Anderson ............ G02B 6/3604 29/428 |

FOREIGN PATENT DOCUMENTS

| | | |
|---|---|---|
| JP | H02-98314 U | 8/1990 |
| JP | H08297216 A | 11/1996 |
| JP | 2003-86967 A | 3/2003 |
| JP | 2008-292821 A | 12/2008 |
| JP | 2019-4472 A | 1/2019 |
| JP | 6979507 B1 | 12/2021 |

OTHER PUBLICATIONS

Notice of Reasons for Refusal issued in Japanese Patent Application No. 2020-211031 dated Jul. 30, 2022.
Notice of Reasons for Refusal issued in Japanese Patent Application No. 2020-211031 dated Mar. 31, 2021.
Decision to Grant a Patent issued in Japanese Patent Application No. 2020-211-31 dated Oct. 25, 2021.

* cited by examiner

*Primary Examiner* — Sung H Pak
(74) *Attorney, Agent, or Firm* — MARSHALL, GERSTEIN & BORUN LLP

(57) ABSTRACT

An attachment tool has a plurality of insertion holes. An optical adapter is fitted into each of the insertion holes. At this time, a holding structure for the optical adapter and the attachment tool has a swaying mechanism that allows the optical adapter to sway against the attachment tool. When a force greater than a prescribed strength is applied to any one of the optical adapters, the swaying mechanism allows the optical adapter to sway in a direction in which the optical adapters are provided side by side. When the force is offloaded, the swaying mechanism can hold the optical adapter in a direction substantially vertical to the attachment tool.

5 Claims, 18 Drawing Sheets

OPTICAL ADAPTER HOLDING STRUCTURE, OPTICAL ADAPTER, METHOD FOR PLUGGING AND UNPLUGGING OPTICAL CONNECTOR, AND METHOD FOR CHECKING BENDING RADIUS OF OPTICAL CABLE

TECHNICAL FIELD

The present invention relates to an optical adapter holding structure and the like that are used for coupling communication cables such as optical fiber cables and optical cords.

BACKGROUND

The number of optical fibers to be laid has continued to rise conventionally due to a rapid increase in optical communication traffic. This has also led to a need of a high-density packaging of optical adapters, which are used at coupling points between optical fiber cables or optical cords. However, when optical adapters are densely packaged, distance between adjacent optical adapters decreases, thereby also reducing distance between optical connectors to be connected. For this reason, when plugging or unplugging an optical connector to an optical adapter, it is impossible to leave space for fingers to be inserted between the adjacent optical connectors.

To make space for plugging and unplugging operations of optical connectors while still densely packaging optical adapters, Japanese Unexamined Utility Model Application Publication No. H02-098314 (JP-UM-A-H02-098314) and Japanese Unexamined Patent Application Publication No. 2003-86967 (JP-A-2003-86967), for example, disclose methods for densely packaging adapters, each of which has a mechanism where an adapter or an adapter mounting tool, to which an optical connector to be plugged or unplugged is to be fitted, is rotated first to create space for plugging and unplugging operations.

FIG. 16 is a view showing an optical adapter holding structure according to JP-UM-A-H02-098314. In JP-UM-A-H02-098314, an optical adapter 100 is attached to an optical adapter attachment tool 107. Also, a plurality of the optical adapter attachment tools 107 are arranged in a row (in a vertical direction to the paper surface of the drawing), and each of the optical adapter attachment tools 107 is attached to a supporting rod 101 so as to rotate independently.

When plugging or unplugging an optical connector 105 to or from an optical adapter 100, first, the optical adapter 100 and the optical adapter attachment tool 107 that are to be plugged/unplugged are rotated in one direction, deviating outward from the row of the other optical adapters (in a direction X in the drawing), to a position where there is an operating space for fingers. Then, the optical connector 105 is plugged into or unplugged out of the optical adapter 100. The optical adapter holding structure has a mechanism in which a spring coil 106 enables the optical adapter attachment tool 107 to return to a predetermined position (the optical adapters arrangement position) after the plugging/unplugging operation.

FIG. 17 is a view showing an optical adapter holding structure according to JP-A-2003-86967. In JP-A-2003-86967, similarly to JP-UM-A-H02-098314, an optical adapter 100 is individually attached to an optical adapter attachment tool 107, and the optical adapter attachment tool 107 is fixed rotatably to a supporting rod 101 independently or interlockingly.

Here, in JP-A-2003-86967, an arrangement direction of the optical adapters 100 is different from that in JP-UM-A-H02-098314, and the plurality of optical adapters 100 are arranged in a shared rotary surface. When plugging or unplugging an optical connector 105 to or from an optical adapter 100, first, the optical adapter attachment tool 107 and the optical adapters 100 in front of the optical adapter 100 to be plugged/unplugged are rotated in one direction (in a direction Y in the drawing) to a position where there is an operating space for fingers between the optical adapter attachment tool, to/from which the optical connector 105 is to be plugged/unplugged, and the adjacent optical connector. Then, the optical connector 105 is plugged/unplugged. The optical adapter holding structure has a mechanism in which the optical adapter attachment tool 107 returns to a predetermined position due to gravity after the plugging/unplugging operation.

However, in the method of JP-UM-A-H02-098314, it is necessary to firstly rotate the optical adapter attachment tool 107 of the optical connector 105 to be plugged/unplugged in the direction deviating outward from the optical adapter arrangement position to the position where there is the operating space for fingers. That is, before plugging or unplugging the optical connector 105, it is necessary to rotate the optical adapter 100 and to hold the optical adapter 100 in this state using fingers or the like, and then the optical connector 105 is plugged/unplugged while maintaining the rotated state.

Also, since a rotation center of the optical adapter 100 is disposed in proximity of the optical adapter 100 and a rotary direction is in an optical axis direction, it is necessary to increase a rotation angle of the optical adapter 100 in order to create the operating space for fingers. This increases an amount of movement of an optical fiber cord, which may cause optical effects. On the other hand, the rotation angle can be decreased if the rotation center of the optical adapter 100 is disposed far from the optical adapter 100. However, increasing distance from the optical adapter 100 to the rotation center results in an increase in size of an optical adapter unit, which contradicts to an idea of packaging the optical adapters 100 as many as possible within a small space.

Also, in JP-A-2003-86967, similarly to JP-UM-A-H02-098314, it is necessary to rotate in advance the optical adapter attachment tool 107 of the optical adapter 100 to be plugged/unplugged to the position where there is the operating space for fingers before plugging/unplugging the optical connector 105. Thus, it is necessary to rotate the optical adapter 100 and to hold the optical adapter 100 in this state using fingers or the like, and then the optical connector 105 is plugged/unplugged while maintaining the rotated state.

Also, in the structure in JP-A-2003-86967, the plurality of optical adapter rotary surfaces are shared. Thus, for example, when plugging/unplugging the optical connector 105 in to/out of the lowest optical adapter 100, it is necessary to rotate all the other optical adapters 100, requiring unnecessary rotary movements of the optical adapters 100.

Furthermore, in JP-A-2003-86967, since all the optical adapters 100 have the same rotation center and are arranged on one side of the connector, it is easy to plug/unplug the optical connectors 105 that are on a far side from the rotation center. However, there is no improvement for the optical connectors 105 that are on a side closer to the rotation center, and improvement effects in plugging/unplugging the connector is restrictive. Also, since the distance from the optical adapters 100 to the rotation center is long, the optical adapter attachment tool 107 is required to be large in size, varying its form according to steps of the optical adapters 100, thereby increasing costs of the components.

Also, in JP-A-2003-86967, there is no mechanism to hold the initial position or posture of the optical adapter attachment tool 107, and thus the optical adapter attachment tool 107 may rotate when being touched even with a small force. In general, when optical fiber cords are wired, there are cases in which the wired cords are shorter or longer than an appropriate length, and the optical connector 105 may not be fitted to the optical adapter attachment tool 107 naturally and directly facing with each other without any stress. In such cases, if there is no mechanism for holding the optical adapter attachment tool 107 in a normal state to a certain extent, there is a possibility that the optical adapter attachment tool 107 rotates easily, depending on wiring situations of the optical fiber cords.

Meanwhile, in JP-UM-A-H02-098314, the spring coil 106 is provided, and the spring coil 106 enables the rotated optical adapter attachment tool 107 to return to the predetermined position. However, it is impossible, while keeping the normal posture, to rotate the optical adapter attachment tool 107 only if unnatural force is applied to the optical fiber cord or the optical connecter 105 to reduce the optical effects.

SUMMARY

The present invention is made in view of above problems, and it is an object of the present invention to provide an optical adapter holding structure and the like that are small in size and excel in workability.

To achieve the above object, a first aspect of the present invention is an optical adapter holding structure including an attachment tool having a plurality of insertion holes that are provided side by side, optical adapters that are to be fitted into one of the plurality of insertion holes, a swaying mechanism that allows the optical adapter to sway against the attachment tool. When a force greater than a prescribed strength is applied to the optical adapter, the swaying mechanism allows the optical adapter to sway in a direction in which the optical adapters are provided side by side. When the force is offloaded, the swaying mechanism can hold the optical adapter in a direction substantially vertical to the attachment tool due to a balance between forces in the swaying mechanism.

The optical adapter may include a protruding portion that protrudes from each of outer face sides of the optical adapter, the outer face sides being orthogonal to the direction in which the optical adapters are provided side by side, and the swaying mechanism may allow the optical adapter to sway with proximity of the protruding portion as a base.

A hard magnetic body may be fixed on each side of the direction in which the optical adapters are provided side by side, or on each side of the direction in which the insertion holes of the attachment tool are provided side by side. A part of the attachment tool facing the hard magnetic body that is provided on the optical adapter, or a part of the optical adapter facing the hard magnetic body that is provided on the attachment tool, may be formed of another hard magnetic body or a soft magnetic body, which can be attracted to the hard magnetic body. An attractive force of the hard magnetic body may be able to hold the optical adapter in a direction substantially vertical to the attachment tool when the optical adapter is inserted into the insertion hole. When the optical adapter receives a force greater than the attractive force of the hard magnetic body, one of the hard magnetic bodies may separate away from a facing face so that the optical adapter can sway.

According to the first aspect of the present invention, when inserting fingers into the space between the adjacent optical adapters to plug or unplug any one of the optical connecters, since the optical adapters are densely arranged, the fingers touch the adjacent optical adapters and the optical connectors. Thus, the adjacent optical connectors receive a force in a direction horizontal to a plugging/unplugging direction of the connector. At this time, applying a force greater than a prescribed strength to adjacent optical coupling members allows the optical coupling members to sway, thereby creating the operation space for fingers. When the force is offloaded, the adjacent optical coupling members return to their original positions. As above, by allowing not the optical coupling member that is to be plugged/unplugged to sway but only the adjacent optical coupling members to sway, a rotational movement and a restoring movement of the optical coupling member that is to be plugged/unplugged are unnecessary, thereby improving workability.

In particular, when a force greater than the prescribed strength is applied to any one of the optical adapters in the direction in which the optical adapters are provided side by side, the swaying mechanism allows the optical adapter to sway in the direction. This ensures that the swaying mechanism can sway the adjacent optical connectors separating away from the optical connector subjected to be plugged/unplugged, which facilitates the operation.

Also, the protruding portions protruding from both outer face sides that are orthogonal to the direction in which the optical adapters are provided side by side are provided, and the optical adapter can sway with the proximity of the protruding portions as the base. This allows proximity of a width center of the optical adapter to be a swaying center of the optical adapter, and this can decrease a moving amount of the optical fiber cord due to swaying. In addition, since the swaying center is close to the attachment tool, it is possible to minimize a difference between plugging/unplugging workability of the optical connector in front of the attachment tool and plugging/unplugging workability of the optical connector at the back of the attachment tool.

Also, the same effects can be obtained if the hard magnetic body is fixed to the optical adapter or the attachment tool, where the part of the attachment tool or the optical adapter facing the hard magnetic body is formed of another hard magnetic body or a soft magnetic body that can be attracted to the hard magnetic body, and the optical adapter is held by the attractive force of the hard magnetic body when the optical adapter is inserted into the insertion hole. A this time, if polarities of the hard magnetic bodies of each of the optical adapters provided side by side are arranged alternately in the direction in which the optical adapters are provided side by side, the hard magnetic bodies of the adjacent optical adapters do not repel each other, and thus the optical adapters can be more densely packaged.

A second aspect of the present invention is a method for plugging or unplugging an optical connector to or from the optical adapter holding structure according to the first aspect of the present invention. The method includes, when plugging or unplugging the optical connector to or from any of the optical adapters, swaying the other optical adapters that are adjacent to the optical adapter in a direction in which the optical adapters are provided side by side by using the swaying mechanism to create space around the optical adapter, and returning the other optical adapters to original positions by using the swaying mechanism after the plugging or unplugging operation is completed.

According to the second aspect of the present invention, the workability is good, and the connector can be plugged or unplugged easily.

A third aspect of the present invention is a method for checking a bending radius of an optical cable that is connected to the optical adapter holding structure according to the first aspect of the present invention. The method includes acquiring in advance a swaying starting moment of a swaying mechanism, acquiring in advance a relationship between a moment applied to an optical adapter and a bending radius of an optical cable at the time of applying a force to the optical cable connected to the optical adapter, making sure that the moment applied to the optical adapter is equal to or less than the swaying starting moment by checking that all the optical adapters are not swaying and are kept in a normal state, and knowing that the bending radius of the optical cable is equal to or more than a certain radius since the moment applied to the optical adapter is equal to or less than a certain moment.

According to the third aspect of the present invention, it is possible to easily check whether the bending radius of the optical cable connected to the optical connector is equal to a prescribed radius or more.

According to the present invention, an optical adapter holding structure and the like that are small in size and excel in workability can be provided.

BRIEF DESCRIPTION OF THE DRAWINGS

FIG. 7 is a view showing an optical adapter 10a.

DETAILED DESCRIPTION

First Embodiment

Figure 1:
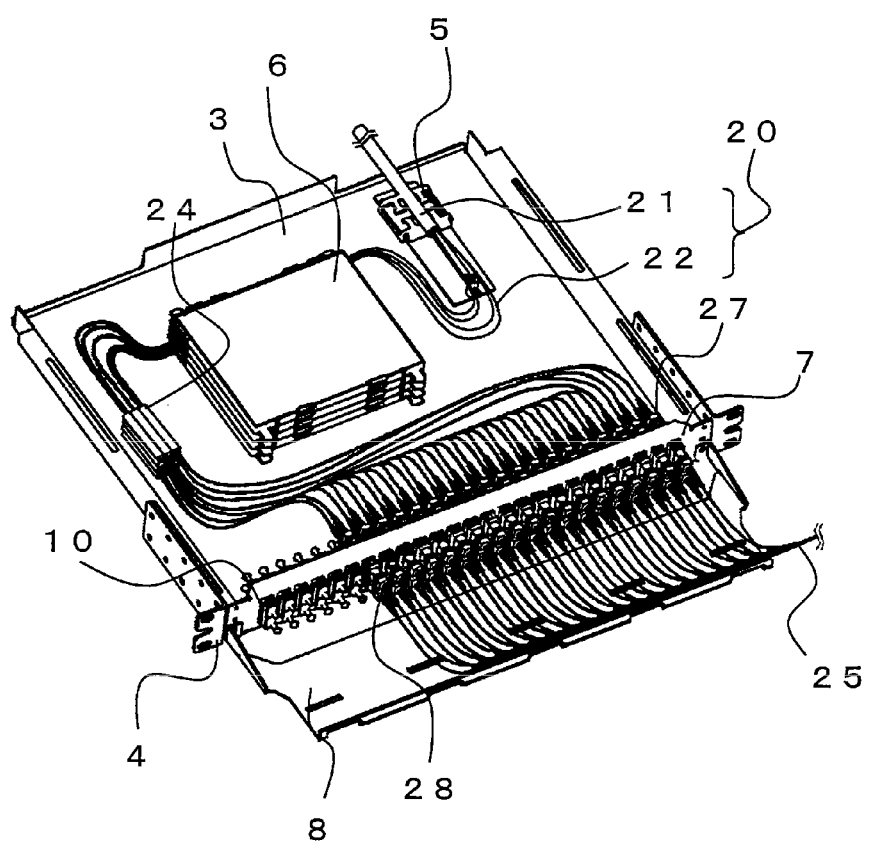
FIG. 1 is a view showing an optical patch panel 3.
Figure 2:
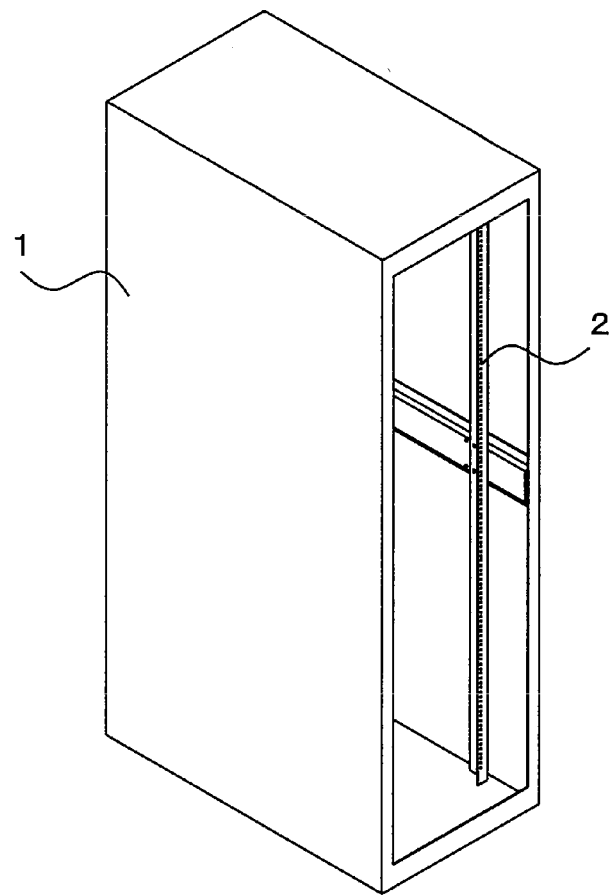
FIG. 2 is a view showing a rack 1.

Hereinafter, some embodiments of the present invention will be described with reference to the accompanying drawings. FIG. 1 is a view showing an optical patch panel 3, which is one embodiment of the present invention. FIG. 2 is a view showing a rack 1. The rack 1 is a 19-inch rack, for example, and the optical patch panel 3 is mounted on the rack 1, and a mounting portion 4 of the optical patch panel 3 is fixed to a frame 2 of the rack 1 by using screws or the like.

An external cable 20 is introduced from a back face side of the optical patch panel 3, and an external cable fixing portion 5 provided at the rear of the optical patch panel 3 fixes the external cable 20 to the optical patch panel 3. A cable sheath 21 of the external cable 20 is removed inside the optical patch panel 3, and optical fibers 22 inside are wired to a fiber-splicing tray 6. The optical fibers 22 and a connector-attached conversion cable 24, which has an optical connector such as SC, LC, or MPO etc. (hereinafter, simply referred to as "SC etc."), are spliced together by fusion or the like. The spliced portions are accommodated inside the fiber-splicing tray 6 along with the extra lengths of the optical fibers 22 and the connector-attached conversion cable 24 such as SC etc. . . .

A plate-shaped attachment tool 7 to which an optical adapter 10 such as SC etc. can be mounted is provided at a front side of the optical patch panel 3. A code-receiving tray 8 is provided further front side of the attachment tool 7. The code-receiving tray 8 can receive connector-attached in-office cables 25 from underneath.

A plurality of the optical adapters 10 are mounted onto the attachment tool 7. An external cable connector 27 is inserted into the optical adapter 10 from the rear side, and an in-office cable connector 28 of the connector-attached in-office cable 25 is inserted into the optical adapter 10 from the front side. The external cable 20 to be connected can be switched by changing the optical adapter 10 to which the in-office cable connector 28 is to be inserted.

A structure of the optical patch panel 3 is not limited to the illustrated example. For example, although the example shows a case in which the external cable 20 without a connector is introduced from the rear side of the optical patch panel 3, a connector-attached cord or a connector-attached cable may also be introduced. In such cases, the structure of the optical patch panel may not include the fiber-splicing tray 6.

Figure 3A:
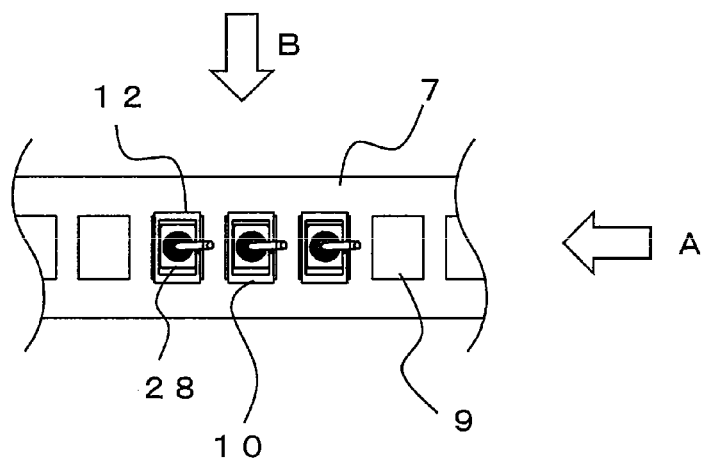
FIG. 3A is a front view showing a state in which an optical adapter 10 and the like are attached to an attachment tool 7.
Figure 3B:
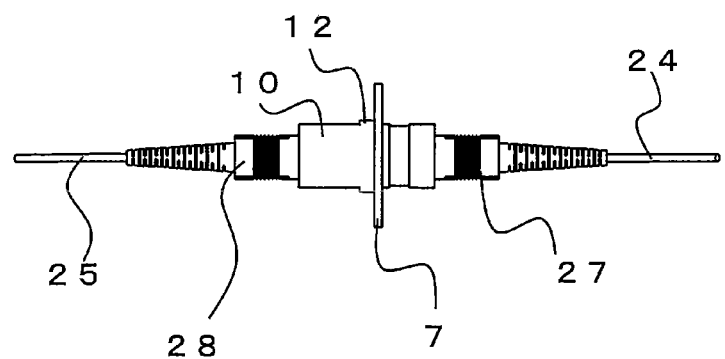
FIG. 3B is a side view showing the state in which the optical adapter 10 and the like are attached to the attachment tool 7.
Figure 3C:
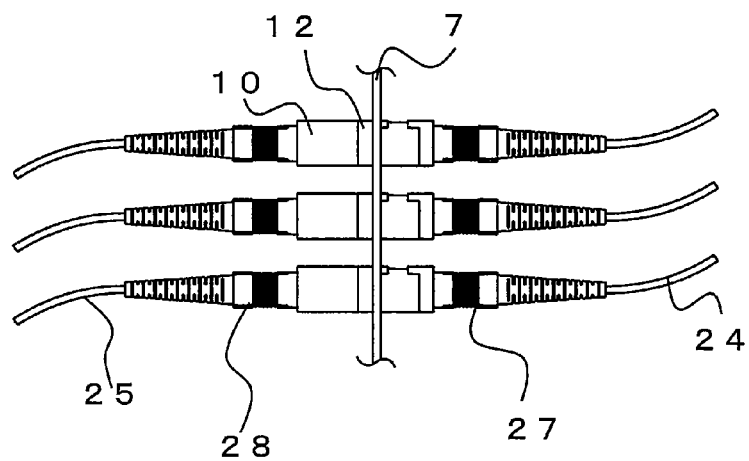
FIG. 3C is a plan view showing the state in which the optical adapter 10 and the like are attached to the attachment tool 7.

Next, movements of the optical adapters etc., which are common to the optical adapters of the present invention, will be described. FIG. 3s are views showing a state in which the optical adapters 10 etc. are mounted onto the attachment tool 7, wherein FIG. 3A is a front view, FIG. 3B is a side view (viewing in a direction of an arrow A in FIG. 3A), and FIG. 3C is a plan view (viewing in a direction of an arrow B in FIG. 3A).

A plurality of substantially rectangular-shaped insertion holes 9 are provided side by side on the attachment tool 7. The optical adapter 10 is fitted into each of the insertion holes 9. For simplification, the drawings show a state in which three of the optical adapters 10 are fitted into the insertion holes 9. As mentioned above, the adjacent optical adapters 10 are disposed extremely close to each other. Also, although the present embodiment includes a swaying mechanism that allows the optical adapter 10 to sway against the attachment tool 7, the swaying mechanism is omitted in FIG. 3 and will be described later.

A vertical cross section of the optical adapter 10 to an optical axis thereof is in a substantially rectangular shape, and a protruding portion 12 protrudes from each of an upper face and a lower face of the optical adapter 10 (both outer faces in a vertical direction in FIG. 3A that is orthogonal to a direction in which the optical adapters 10 are provided side by side). An overall height of the optical adapter 10 including the protruding portions 12 is higher than a height of the insertion hole 9. Thus, when being inserted into the insertion hole 9, the optical adapter 10 is inserted to the vicinity of the protruding portions 12. On the other hand, a width of the insertion hole 9 is sufficiently larger than a width of the optical adapter 10 (the direction in which the optical adapters 10 are provided side by side is to be a width direction). Thus, there is a certain clearance formed between the optical adapter 10 and each edge portion of the insertion hole 9. The clearance is set according to a possible swaying range of the optical adapter 10, which will be described later.

Figure 4A:
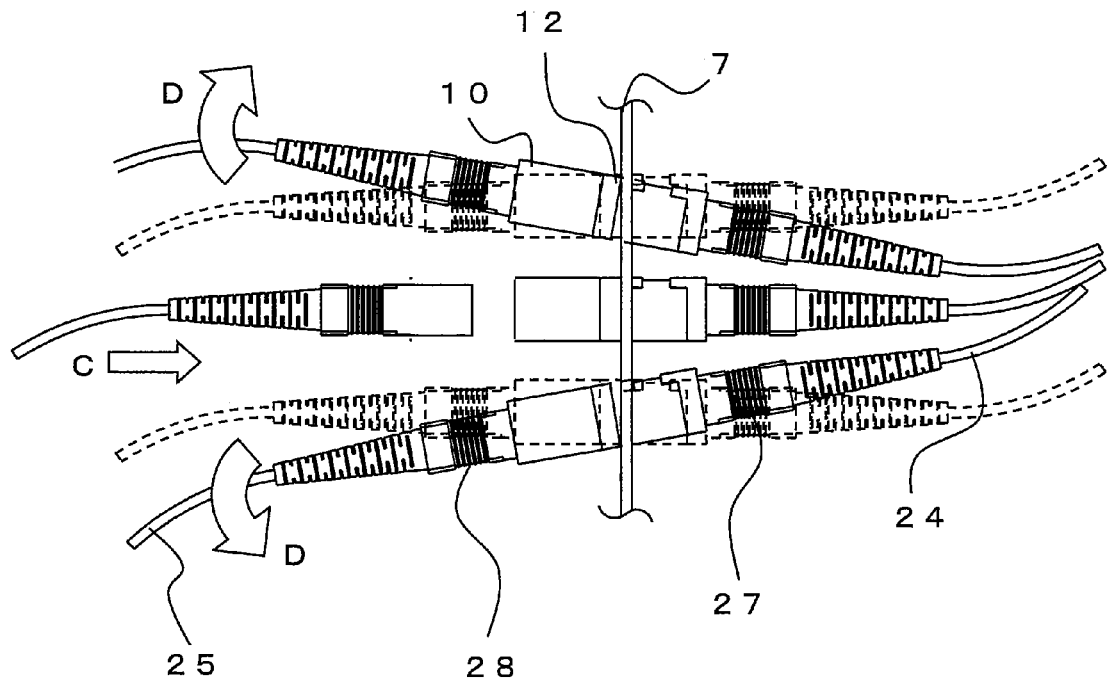
FIG. 4A is a view showing movements of the optical adapter 10.

Next, a method for plugging or unplugging an optical connector with respect to the optical adapter holding structure will be described. FIG. 4s are views showing movements of the optical adapters 10. First, as shown in FIG. 4A, when connecting the in-office cable connector 28 to the middle optical adapter 10 in the drawing, the in-office cable connector 28 is moved straightly toward the targeted optical adapter 10 (in a direction of an arrow C in the drawing). At this time, space between the adjacent in-office cable connectors 28 and the optical adapters 10 is small, and the fingers come into contact with the adjacent in-office cable connectors 28 and the optical adapters 10.

Figure 4B:
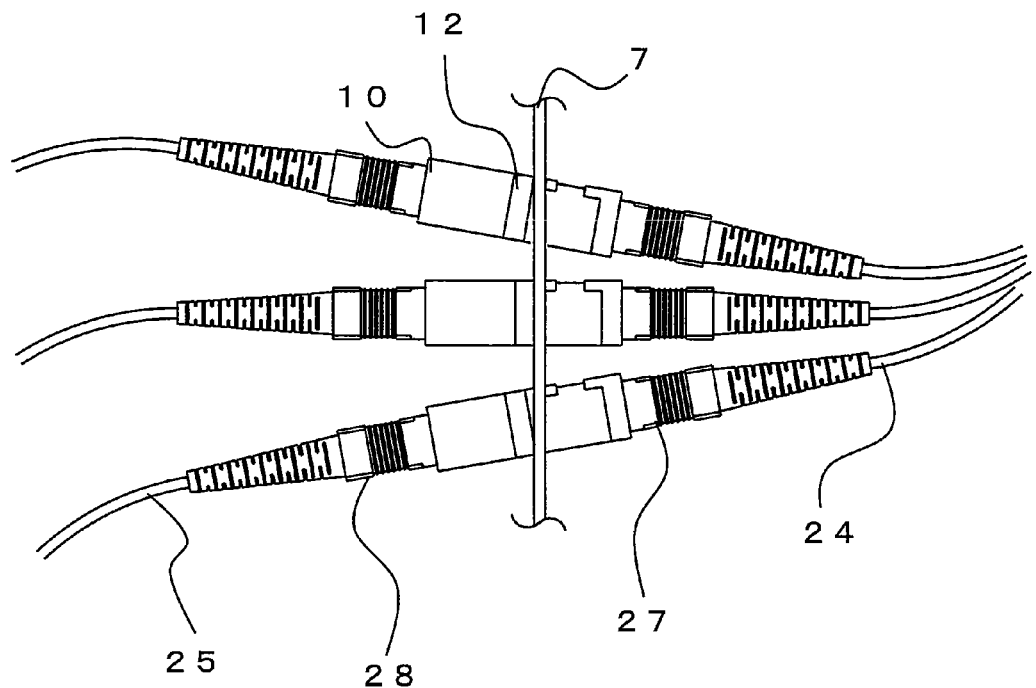
FIG. 4B is a view showing movements of the optical adapter 10.

At this time, because of the swaying mechanism provided at an attached portion between the optical adapter 10 and the attachment tool 7, which will be described below, the in-office cable connectors 28 and the optical adapters 10 that are touched by the fingers sway in the direction in which the optical adapters 10 are provided side by side (in a direction of an arrow D in the drawing). That is, when plugging or unplugging the optical connector with respect to any one of the optical adapters 10, the swaying mechanism below allows the other optical adapters 10 that are adjacent to the targeted optical adapter 10 to sway in the direction in which the optical adapters 10 are provided side by side, and this creates space around the targeted optical adapter 10. In this way, operation space can be obtained around the targeted optical adapter 10, and, as shown in FIG. 4B, the in-office cable connector 28 can be plugged into the optical adapter 10.

Then, when the fingers are removed from the space between the in-office cable connectors 28, an original state (FIG. 3C) is restored. That is, after the plugging/unplugging operation, the swaying mechanism can return the other adjacent optical adapters 10 to the original position. As above, when a force greater than a prescribed strength is applied to any one of the optical adapters 10, the swaying mechanism allows the optical adapter 10 to sway in the direction, and when the force is offloaded, the swaying mechanism can hold the optical adapter 10 in a direction substantially vertical to the attachment tool 7 due to a balance between forces in the swaying mechanism.

This is also similar in a case in which the in-office cable connector 28 is unplugged from the optical adapter 10. In addition, when plugging/unplugging the in-office connector 28, the optical adapters 10 sway in a direction so as to move the external cable connectors 27 on the other side closer to each other. Whereas when plugging/unplugging the external cable connector 27, the optical adapters 10 sway in a direction so as to increase the space between the external cable connectors 27 and decrease the space between the in-office cable connectors 28.

As above, the swaying mechanism according to one embodiment of the present invention allows only the adjacent optical adapters 10 to sway and not the optical adapter 10 that is to be plugged/unplugged. Thus, it is unnecessary to hold the swaying state by hand at the time of plugging/unplugging operation of the optical connector. That is, touching by fingers during the operation allows the optical adapters 10 to sway for only an amount needed, and, when the operation is completed, the optical adapters 10 automatically return to the original state.

Here, it is preferable that a swaying angle of the optical adapter 10 is approximately ±20 degrees or less. If the swaying angle is greater than ±20 degrees, the adjacent connector-attached conversion cables 24 or the connector-attached in-office cables 25 may interfere with each other when the optical adapter 10 sways, and this may cause optical effects. Thus, the width of the insertion hole 9 is set so that the swaying angle of the optical adapter 10 is within the above range. That is, with respect to the width of the optical adapter 10, increasing the width of the insertion hole 9 greater than a certain value allows the optical adapter 10 to sway, and decreasing the width of the insertion hole 9 smaller than a certain value restricts the swaying angle of the optical adapter 10 to ±20 degrees or less.

In general, the optical adapter 10 such as LC etc. has a rectangular cross section to the optical axis direction, having shorter sides and longer sides. At this time, it is preferable to dispose the optical adapter 10 on the attachment tool 7 making the swaying direction and the shorter sides being parallel to each other (i.e., the optical adapter 10 can sway toward the longer sides). This can reduce an amount of movement of the optical adapter 10 when swaying. At this time, the optical adapter 10 may be either a single-core type or a multi-core type.

Figure 5A:
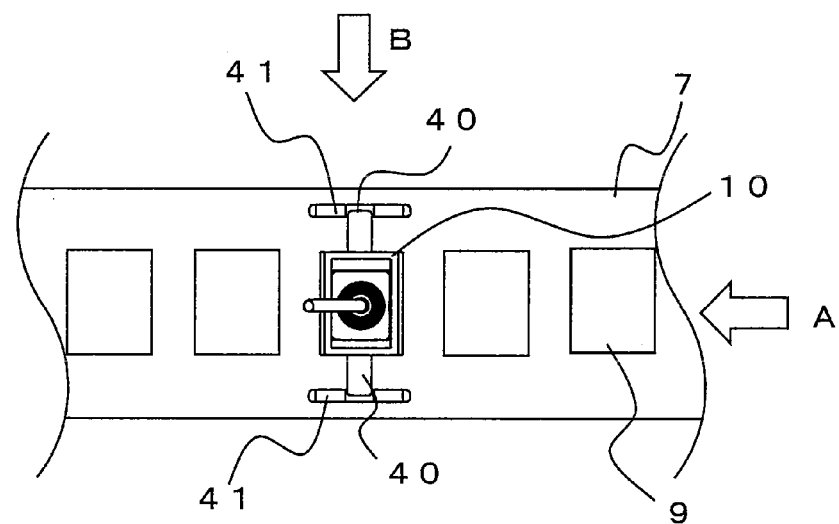
FIG. 5A is a front view showing a state in which the optical adapter 10 using an elastic member 40 is attached to the attachment tool 7.
Figure 5B:
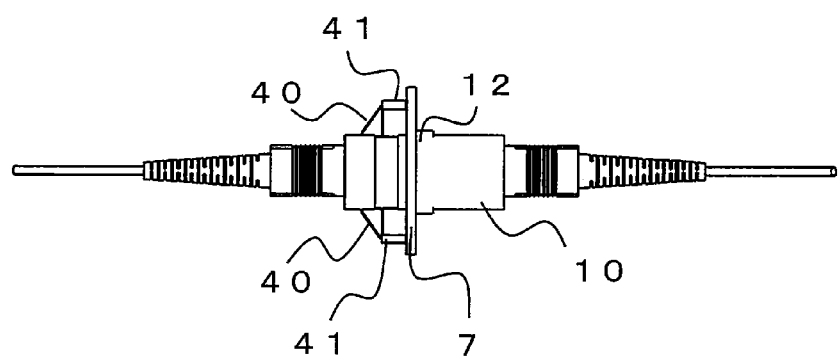
FIG. 5B is a side view showing the state in which the optical adapter 10 using the elastic member 40 is attached to the attachment tool 7.
Figure 5C:
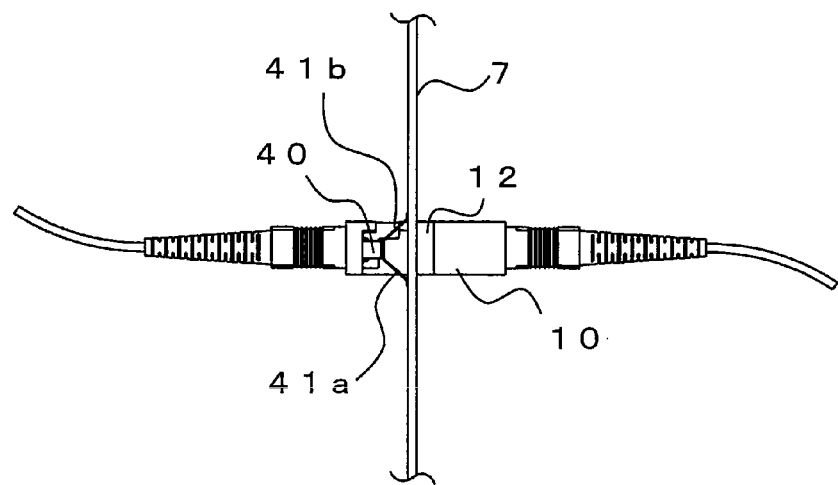
FIG. 5C is a plan view showing the state in which the optical adapter 10 using the elastic member 40 is attached to the attachment tool 7.
Figure 6A:
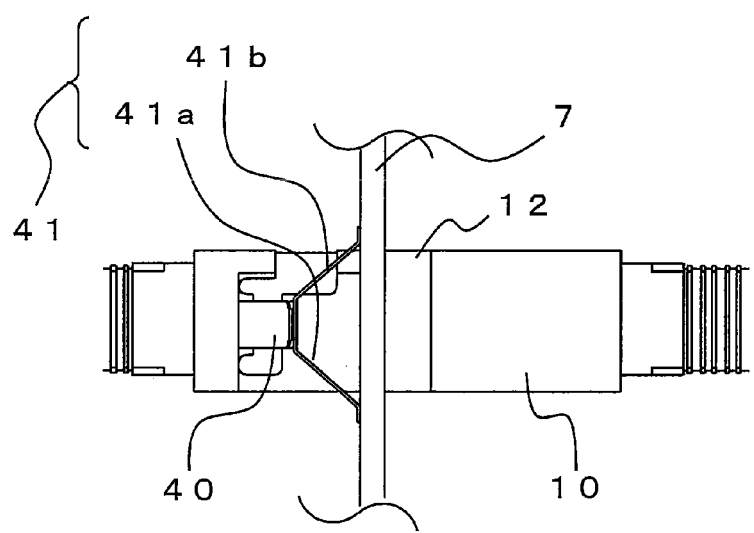
FIG. 6A is a view showing a movement of the optical adapter 10 using the elastic member 40.

Next, a swaying mechanism will be described in detail. FIG. 5s are views showing the optical adapter holding structure including a swaying mechanism using an elastic member 40. FIG. 5A is a front view, FIG. 5B is a side view (viewing in a direction of an arrow A in FIG. 5A), and FIG. 5C is a plan view (viewing in a direction of an arrow B in FIG. 5A). FIG. 6A is an enlarged view showing proximity of the swaying mechanism.

When a force greater than a prescribed strength is applied to any one of the optical adapters 10 in the direction in which the optical adapters 10 are provided side by side, the swaying mechanism of the present embodiment allows the optical adapter to sway in the direction. At this time, the protruding portions 12 are provided in a direction orthogonal to the swaying direction of the optical adapter 10. That is, the swaying mechanism can sway the optical adapter 10 with proximity of the above-mentioned protruding portions 12 as a base.

The optical adapter 10 has an elastic member 40 that is disposed on a face on which each of the protruding portions 12 is formed and at a position away from the protruding portion 12. The elastic member 40 is formed of a flat metal spring, for example. The elastic members 40 on upper and lower faces of the optical adapter 10 are configured as one body with a side face joining the elastic members on the upper and lower faces. Thus, the elastic member 40 can be attached and fixed to the optical adapter 10 by fitting the elastic member 40 into an attachment-fitting stopper concave portion that is provided on the side face joining the upper and lower faces of the optical adapter 10. However, the fixing method for the elastic member 40 is not particularly limited.

As shown in FIG. 5B and FIG. 5C, the optical adapter 10 is attached to the attachment tool 7 by placing the attachment tool 7 (edge portions of the insertion hole 9) between the protruding portions 12 and the elastic members 40. Here, each elastic member 40 is provided with a wing portion 41a and a wing portion 41b, being symmetric and extending in the width direction of the optical adapter 10 (the wing portion 41a and the wing portion 41b will be sometimes collectively referred to as a wing portion 41). The wing portion 41 is formed so that a width thereof gradually increases toward the facing protruding portions 12 (toward the attachment tool 7). When the optical adapter 10 is inserted into the insertion hole 9, edge portions of the elastic member 40 (the wing portion 41) come into contact with one face of the attachment tool 7.

When attaching the optical adapter 10 to the attachment tool 7, first, the optical adapter 10 without the elastic member 40 being mounted is inserted into the insertion hole 9 from one side of the attachment tool 7 until the protruding portions 12 come into contact with the attachment tool 7. Next, the elastic member 40 is attached to the optical adapter 10 from the other side of the attachment tool 7 by warping the wing portions 41a and 41b. In this way, the optical adapter 10 can be attached to the attachment tool 7.

In a state shown in FIG. 6A (i.e., a state in which no external force is applied, hereinafter referred to as 'normal state'), the wing portions 41a and 41b are warped equally. Thus, the optical adapter 10 can maintain a vertical posture against the attachment tool 7. That is, at contacting portions between the elastic member 40 and the attachment tool 7, the elastic member 40 receives a reaction force in a direction opposite to a contacting direction, and the optical adapter 10 is held at a position where the reaction forces received by both sides of the elastic member 40 (the wing portions 41a and 41b) are balanced.

Figure 6B:
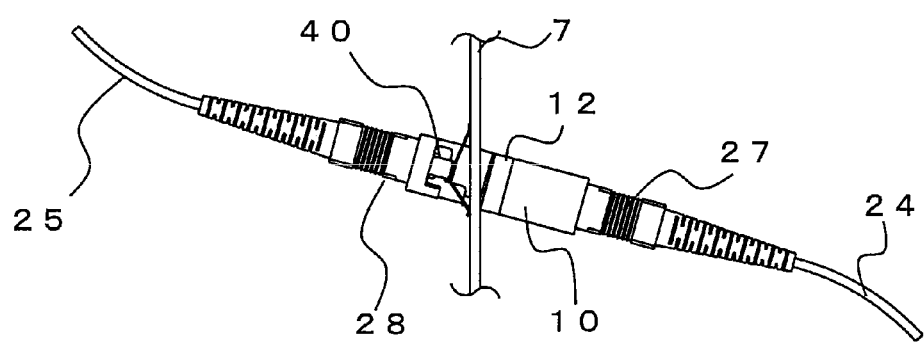
FIG. 6B is a view showing a movement of the optical adapter 10 using the elastic member 40.
Figure 6C:
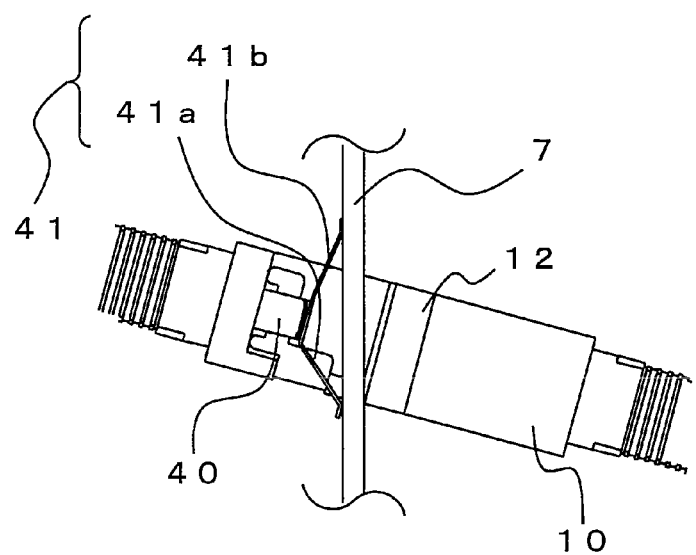
FIG. 6C is a view showing a movement of the optical adapter 10 using the elastic member 40.

When the optical adapter 10 receives a force in the direction in which the optical adapters 10 are provided side by side from this state, the elastic member 40 (the wing portions 41a and 41b) deforms and the optical adapter 10 sways. FIG. 6B is a view showing a state when the optical adapter 10 sways, and FIG. 6C is an enlarged view of proximity of the swaying mechanism in such the state. When the external cable connector 27 or the in-office cable connector 28 receives an external force in a direction that is orthogonal to the optical axis, the optical adapter 10 tilts with an end portion of the protruding portion 12 as a center. At this time, the wing portion 41 that is farther away from the tilting center (the wing portion 41b in the drawing) approaches the attachment tool 7, and the warping of the wing portion 41 increases greater than at the time of the normal state, thereby increasing a repulsive force. That is, the optical adapter 10 starts to sway when a force greater than the repulsive force by the elastic member 40 is applied.

When the external force is removed from this state, the optical adapter 10 returns to the normal state in which the repulsive forces of the wing portions 41a and 41b are balanced. That is, when there is no external force, the optical adapter 10 returns to the vertical posture against the attachment tool 7.

As above, according to the first embodiment of the present invention, when the external force is applied to the optical adapter 10 in the direction in which the optical adapters 10 are provided side by side, elastic deformation of the elastic member 40 (the wing portion 41) allows the optical adapter 10 to sway. At this time, an operation of rotating the optical adapter 10 to be plugged/unplugged in a desired direction is unnecessary, and also there is no need to hold the swaying state of the optical adapter 10 to be connected when being plugged or unplugged. Also, when the external force is removed, it is possible to return the optical adapter 10 to the substantially vertical posture against the attachment tool 7 at the position where both the wing portions 41a and 41b are balanced. Thus, the optical adapter holding structure that is small in size and excels in workability can be obtained.

Second Embodiment

Figure 7:
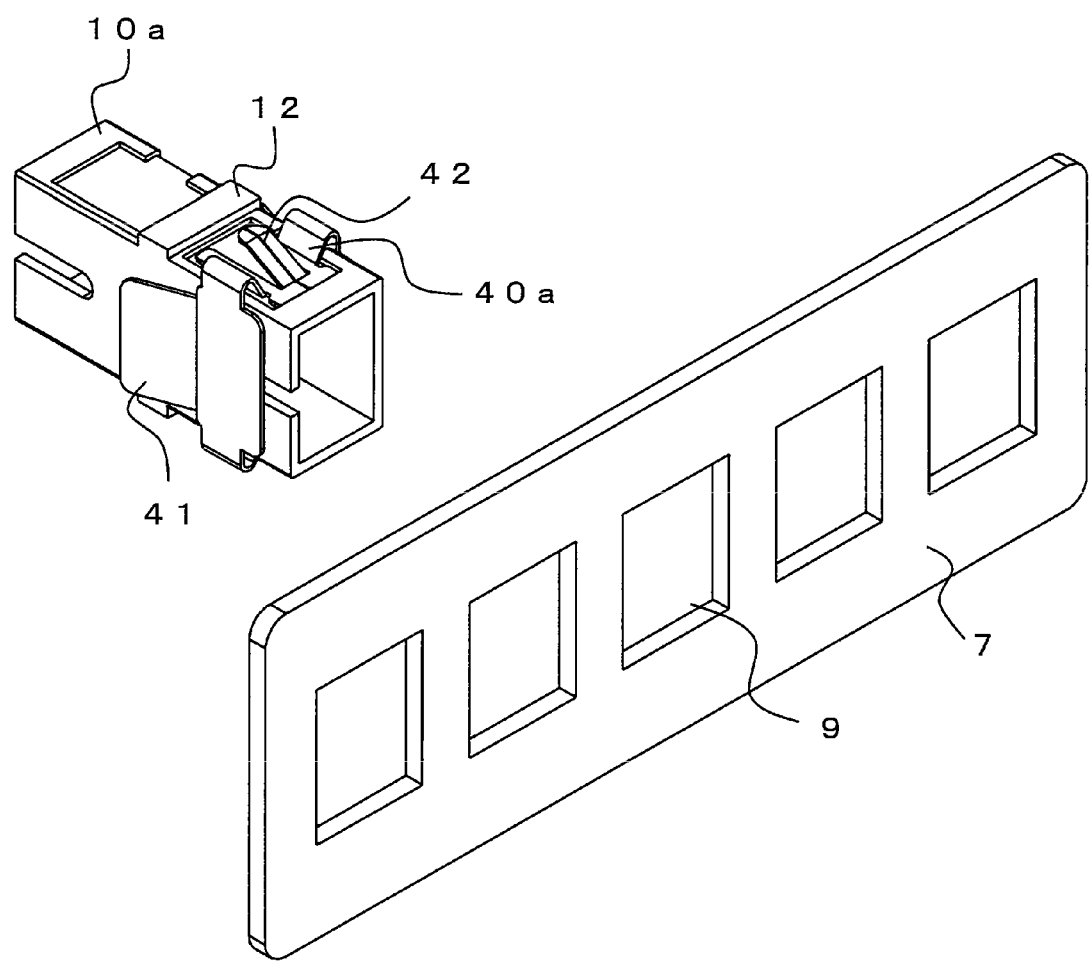

Next, a second embodiment will be described. FIG. 7 is a view showing an optical adapter 10a according to the second embodiment of the present invention. In the descriptions hereafter, structures having the same function as in the first embodiment will have the same notations as in FIG. 1 to FIG. 6, and redundant descriptions will be omitted for each embodiment.

The optical adapter 10a has approximately the same structure as the optical adapter 10 except that an elastic member 40a is used as the swaying mechanism. In the optical adapter 10a, the elastic member 40a formed of a flat metal spring is divided symmetrically into two parts. The elastic member 40a is fixed to the optical adapter 10a by being fitted into an attachment-fitting stopper concave portion that is provided on upper and lower faces of the optical adapter 10a, for example.

Each elastic member 40a has the wing portion 41 on a side face of a width direction of the optical adapter 10a. That is, the optical adapter 10a has a pair of the elastic members 40a (the wing portions 41) on both face sides that are orthogonal to a forming face of the protruding portions 12. The wing portions 41 on both side faces of the optical adapter 10a are formed so that a width therebetween gradually increases toward the rear side (a side opposite to a direction to which the optical adapter 10a is attached to the attachment tool 7).

A locking piece 42 is formed facing the protruding portion 12 at a position away from the protruding portion 12 on each of the upper and lower faces of the optical adapter 10a. When the optical adapter 10a is inserted into the insertion hole 9, the locking piece 42 is pressed by an edge portion of the insertion hole 9 and deforms. When the optical adapter 10a is further pushed into the attachment tool 7 (the insertion hole 9) until the protruding portion 12 comes into contact with the attachment tool 7, a tip end of the locking piece 42 passes completely through the attachment tool 7 and the locking piece 42 returns to its original form. That is, the locking piece 42 stretches vertically.

Here, an overall height including the protruding portions 12 and an overall height including tip ends of the locking pieces 42 of the upper and lower faces of the optical adapter 10*a* are larger than the height of the insertion hole 9. Thus, the attachment tool 7 (edge portions of the insertion hole 9) is placed between the protruding portions 12 and the locking pieces 42 so that the optical adapter 10*a* can be attached to the attachment tool 7. That is, the locking pieces 42 passing through the insertion hole 9 of the attachment tool 7 prevent the optical adapter 10*a* from falling off from the attachment tool 7, and thus the optical adapter holding structure can be obtained.

In a state in which the optical adapter 10*a* is inserted into the insertion hole 9, the elastic members 40*a* (the wing portions 41) on both sides of the optical adapter 10*a* come into contact with the edge portions or inner faces of the insertion hole 9. At contacting portions between the elastic members 40*a* (the wing portions 41) and the attachment tool 7, the elastic members 40*a* (the wing portions 41) receive a reaction force in a direction opposite to a contacting direction. At this time, in the normal state, the optical adapter 10*a* can be held at a position where the reaction force received by both sides of the elastic members 40*a* (the wing portions 41) are balanced. That is, in such the case, the repulsive force due to warping of the elastic members 40*a* (the wing portions 41) on both sides are balanced and thus the optical adapter 10*a* can maintain a vertical posture against the attachment tool 7.

Also, when the optical adapter 10*a* receives an external force in the direction in which the optical adapters 10*a* are provided side by side, the elastic members 40*a* (the wing portions 41) deform, and thus the optical adapter 10*a* can sway. More specifically, when the optical adapter 10*a* receives the external force in a direction in which the optical adapter 10*a* sways, the optical adapter 10*a* tilts with the end portion of the protruding portion 12 as a center, and a repulsive force is increased due to an increase in warping of the wing portion that is on a closer side of the tilting center. Also, when the external force is removed, the normal state in which the repulsive forces of the wing portions 41 are balanced (the vertical posture of the optical adapter 10*a*) can be restored.

A distance between the protruding portion 12 and the tip end of the locking piece 42 is greater than a thickness of the attachment tool 7. That is, there is a clearance between the protruding portion 12 and the attachment tool 7, and between the locking piece 42 and the attachment tool 7. This prevents the locking pieces 42 from obstructing the swaying of the optical adapter 10*a*.

According to the second embodiment, the same effects as in the first embodiment can be obtained. Also, since the optical adapter 10*a* has the deformable locking pieces 42, the optical adapter 10*a* can be attached to the attachment tool 7 only by inserting the optical adapter 10*a* attached with the elastic members 40*a* into the insertion hole 9.

The elastic members are flat metal springs in the above-mentioned working example. However, non-limiting other examples of the elastic members may be formed of flexible plastics, foam bodies, or rubber, etc. Also, a shape of the elastic member is not limited to a plate shape, and may be in a coil shape having an elastic function.

Third Embodiment

Figure 8:
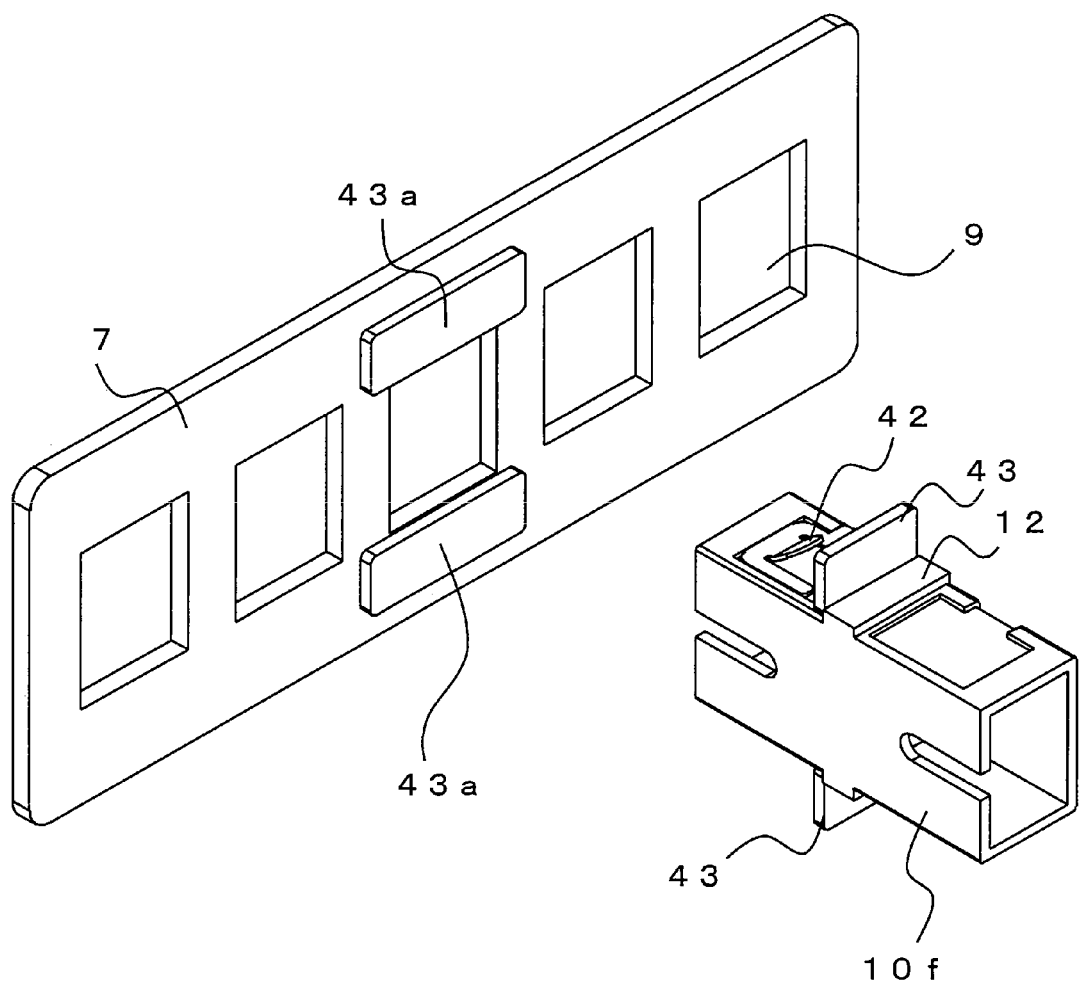
FIG. 8 is a view showing an optical adapter 10f.

Next, a third embodiment will be described. FIG. 8 is a view showing an optical adapter 10*f* according to the third embodiment of the present invention. In the above-mentioned first and second embodiments, examples in which the elastic members are used as the swaying mechanism have been described. In the present embodiment, the optical adapter holding structure in which a hard magnetic body (a magnet) is used as the swaying mechanism will be described.

A hard magnetic body 43 is fixed on a front face of each of the upper and lower protruding portions 12 of the optical adapter 10*f* (on a side face facing the attachment tool 7). For example, the hard magnetic body 43 in a plate shape formed of ferrite or neodymium is fixed to the protruding portion 12 by using an adhesive or the like. That is, the hard magnetic body 43 is disposed so as to protrude vertically from the optical adapter 10*f*. It may be unnecessary to provide the protruding portions 12 on a main body of the optical adapter 10*f*, and the hard magnetic body 43 itself may function as a protruding portion. Thus, for example, the hard magnetic body 43 may be fixed at a part other than the protruding portion 12, and a fixing method for the hard magnetic body 43 is not particularly limited.

Also, the locking piece 42 is formed facing the hard magnetic body 43 at a position away from the hard magnetic body 43 (i.e., the part functioning as the protruding portion) on each of the upper and lower faces of the optical adapter 10*f*. The locking piece 42 has the same structure as the one in the optical adapter 10*a* and the like. That is, by only inserting the optical adapter 10*f* attached with the locking pieces 42 into the insertion hole 9, the edge portion of the insertion hole 9 is placed between the hard magnetic body 43 and the locking piece 42, and thus the optical adapter holding structure in which the optical adapter 10*f* is attached to the attachment tool 7 can be obtained.

Also, a hard magnetic body 43*a* is disposed at a part where the optical adapter 10*f* and the attachment tool 7 face each other. At this time, the hard magnetic bodies 43 and 43*a*, which are disposed respectively on the positions where the optical adapter 10*f* and the attachment tool 7 face each other, are fixed so that the same poles face each other. That is, the hard magnetic body 43 and the hard magnetic body 43*a* repel each other. If the attachment tool 7 is formed of a soft magnetic body, the hard magnetic body 43*a* is attached to the attachment tool 7 by means of a magnetic force.

Here, the hard magnetic bodies 43 are disposed being symmetric about a width direction of the optical adapter 10*f*. Also, sizes and positions of the hard magnetic bodies 43*a* and the like are set so that repulsive forces between the hard magnetic bodies 43 and the hard magnetic bodies 43*a* are substantially equal about the width direction of the optical adapter 10*f*. When the optical adapter 10*f* is inserted into the insertion hole 9 until the locking pieces 42 pass through the attachment tool 7, due to the repulsive force between the hard magnetic bodies 43 and 43*a*, a force is applied to the optical adapter 10*f* in a direction that the optical adapter 10*f* falls out of the insertion hole 9.

At this time, the locking pieces 42 prevent the optical adapter 10*f* from falling out of the insertion hole 9, and, at the same time, the optical adapter 10*f* is held at a position where the repulsive forces given equally in the width direction between the hard magnetic bodies 43 and the hard magnetic bodies 43*a* are balanced. That is, when the optical adapter 10*f* is inserted into the insertion hole 9, there is a certain clearance between the hard magnetic body 43 and the hard magnetic body 43*a*, and holding the optical adapter 10*f* at the position where the repulsive forces between the hard magnetic bodies 43 and 43*a* are balanced can maintain the optical adapter 10*f* in an approximately vertical posture against the attachment tool 7.

When the optical adapter 10*f* receives a force toward the direction in which the optical adapters 10*f* are provided side by side, a part of the hard magnetic body 43 and a part of the hard magnetic body 43*a* approach each other, and thus the optical adapter 10*f* can sway. More specifically, when the optical adapter 10*f* receives an external force in a direction in which the optical adapter 10*f* sways, the optical adapter 10*f* tilts with a contacting point between the locking piece 42 and the attachment tool 7 as a center so that the hard magnetic body 43 and the hard magnetic body 43*a* approach each other on one side of the width direction of the optical adapter 10*f*. At this time, a moment by the repulsive magnetic force on a side where a distance of separation between the hard magnetic body 43 and the hard magnetic body 43*a* is shorter increases, and a moment by the repulsive magnetic force on a side where a distance of separation between the hard magnetic body 43 and the hard magnetic body 43*a* is longer decreases. Thus, a force to return to the original state is always applied to the optical adapter 10*f*. Thus, when the external force is removed, the optical adapter 10*f* can be restored to the normal state (the vertical posture of the optical adapter 10*f*).

According to the third embodiment, the same effects as in the first embodiment can be obtained. As above, the similar swaying mechanism can be obtained by utilizing the repulsive force between the hard magnetic bodies 43 and 43*a*. The hard magnetic bodies 43 and 43*a* may be disposed symmetric about both side faces of the width direction of the optical adapter 10*f*, as long as the adjacent optical adapters 10*f* do not interfere with each other.

Fourth Embodiment

Figure 9:
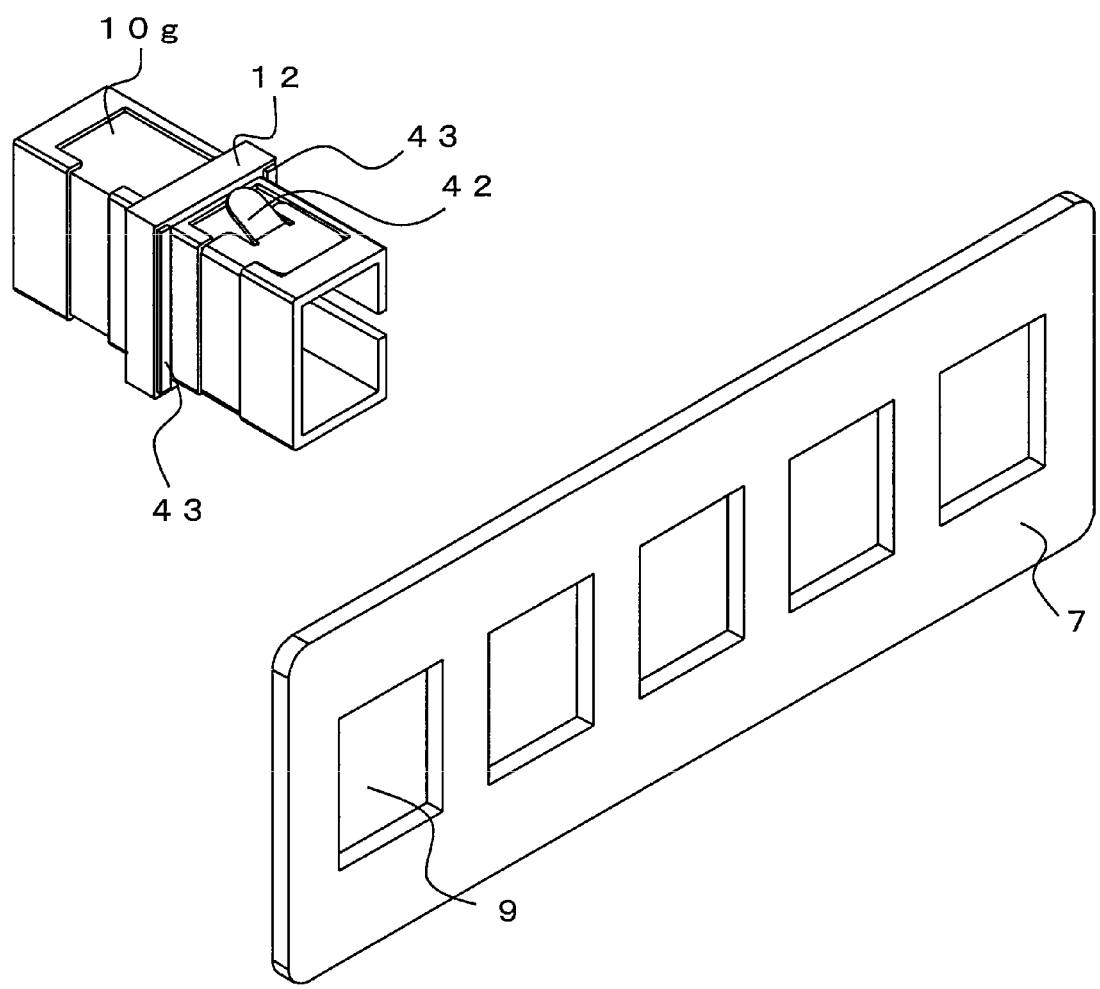
FIG. 9 is a view showing an optical adapter 10g.

Next, a fourth embodiment will be described. FIG. 9 is a view showing an optical adapter 10*g* according to the fourth embodiment of the present invention. The optical adapter 10*g* includes the hard magnetic bodies 43 that are fixed on both sides of the direction in which the optical adapters are provided side by side (the direction in which the insertion holes 9 of the attachment tool 7 are provided side by side). That is, the hard magnetic bodies 43 are disposed so as to protrude from both sides of the optical adapter 10*g*.

Also, the locking piece 42 is formed facing the protruding portion 12 at a position away from the protruding portion 12 on each of the upper and lower faces of the optical adapter 10*g*. The locking piece 42 has the same structure as the one in the optical adapter 10*a* and the like. That is, by only inserting the optical adapter 10*g* attached with the locking pieces 42 into the insertion hole 9, the edge portion of the insertion hole 9 is placed between the protruding portion 12 and the locking piece 42, and thus the optical adapter holding structure in which the optical adapter 10*g* is attached to the attachment tool 7 can be obtained. The protruding portion 12 is not always necessary.

In general, the attachment tool 7 to which the optical adapters are attached is made of a steel plate having a thickness of approximately between 1.6 mm and 2.0 mm. That is, the attachment tool 7 is formed of a soft magnetic body to which the hard magnetic body 43 can be strongly attracted. If the attachment tool 7 is formed of resin or the like, a plate material made of a soft magnetic body or another hard magnetic body that can be attracted to the hard magnetic body 43 may be put on a face of the attachment tool 7 facing the hard magnetic body 43. That is, a part of the attachment tool 7 facing the hard magnetic body 43 is formed of another hard magnetic body or a soft magnetic body that can be attracted to the hard magnetic body 43.

Here, the hard magnetic bodies 43 on both sides of the optical adapter 10*g* are disposed symmetric in a width direction of the optical adapter 10*g*. That is, the sizes and positions of the hard magnetic bodies 43 and the like are set so that attractive forces between the hard magnetic bodies 43 and the attachment tool 7 are approximately equal about the width direction of the optical adapter 10*g*. When the optical adapter 10*g* is inserted into the insertion hole 9, each of the hard magnetic bodies 43 is attracted to a surface of the attachment tool 7 (the surface on both sides of the insertion hole 9). That is, a width between parts to which the hard magnetic bodies 43 are disposed is larger than the width of the insertion hole 9. At this time, the hard magnetic bodies 43 are disposed symmetric in the width direction of the optical adapter 10*g* (equally positioned on the left and right of the width direction). Thus, a flat face of the hard magnetic body 43 and a flat face of the attachment tool 7 are attracted to each other and the optical adapter 10*g* is attached to the attachment tool 7.

As above, in a state in which the optical adapter 10*g* is inserted into the insertion hole 9, the optical adapter 10*g* is attached to the attachment tool 7 due to the attractive force of the hard magnetic bodies 43 on both sides of the width direction of the optical adapter 10*g*. Thus, at a normal time, the optical adapter 10*g* is attached substantially vertical to the attachment tool 7 by magnetic attractive force and its posture can be maintained. The locking pieces 42 are not always necessary if the attractive force of the hard magnetic body 43 is strong enough.

Figure 10:
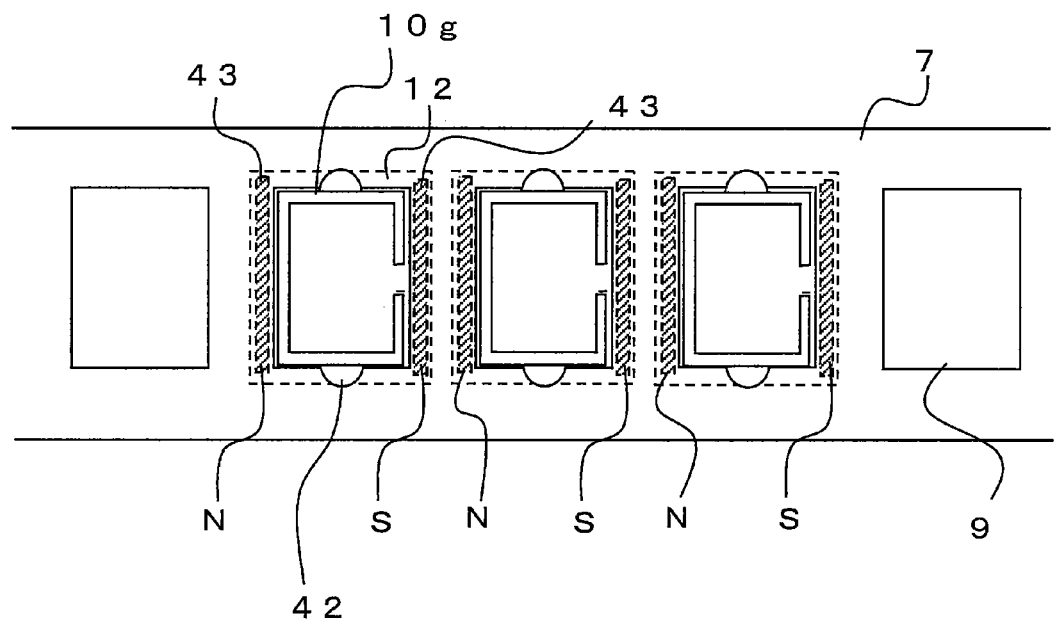
FIG. 10 is a view showing polarities of hard magnetic bodies when the optical adapters 10g are provided side by side.

FIG. 10 is a view showing a state in which the optical adapters 10*g* are provided side by side on the attachment tool 7. The hard magnetic bodies 43 on both sides of the optical adapter 10*g* are disposed so that polarities thereof are opposite to each other. 'N' and 'S' in the drawing show the polarity of the hard magnetic bodies. Also, polarities of the hard magnetic bodies 43 of the optical adapters 10*g* that are provided side by side are arranged alternately in the direction in which the optical adapters 10*g* are provided side by side. That is, the polarities of the neighboring hard magnetic bodies 43 of the adjacent optical adapters 10*g* are opposite to each other.

If the hard magnetic bodies of the adjacent optical adapters 10*g* have the opposite polarities as above, both are attracted to each other. That is, in a state in which the optical adapters 10*g* are attracted to the attachment tool 7, the hard magnetic bodies are also attracted to each other and stabilized.

On the other hand, if the polarities of the hard magnetic bodies 43 on both sides of the optical adapter 10*g* are all the same, the hard magnetic bodies of the adjacent optical adapters 10*g* have the same polarity. Thus, the hard magnetic bodies repel each other. That is, in a state in which the optical adapters 10*g* are attracted to the attachment tool 7 and the hard magnetic bodies repel each other, a force in a direction in which the optical adapters 10*g* are separated away from the attachment tool 7 is applied, which may result in an unstable state. Thus, to reduce such effects, there are cases in which the distance between the optical adapters 10*g* (the adjacent hard magnetic bodies) is kept longer, and this may reduce package density.

As above, the hard magnetic bodies 43 on both sides of the width direction of the optical adapter 10*g* have the opposite polarities to each other, and the polarities of the hard magnetic bodies 43 of the optical adapters 10*g* that are provided side by side are disposed alternately to the direction in which the optical adapters 10*g* that are provided side by side. This can make the adjacent optical adapters 10g to be closer to each other, thereby increasing the package density.

When such the optical adapter 10g receives a force that is greater than the attractive forces of the hard magnetic bodies 43 in the direction in which the optical adapters 10g are provided side by side, one of the hard magnetic bodies 43 lifts up from the attachment tool 7, and the optical adapter 10g can sway. More particularly, when the optical adapter 10g receives an external force in a swaying direction, the optical adapter 10g tilts with an end portion of one of the hard magnetic bodies 43 as a center, and the other hard magnetic body 43 leaves the facing face of the attachment tool 7. When the external force is removed in such the state, the optical adapter 10g can return to the normal state (a vertical posture of the optical adapter 10g) since there is always an attractive magnetic force between the hard magnetic body 43 and the attachment tool 7, which has a soft magnetic property.

According to the fourth embodiment, the same effects as in the first embodiment can be obtained. As above, the similar swaying mechanism can be obtained by utilizing the attractive force of the hard magnetic body 43 in place of the elastic member. Also, disposing the polarities of the hard magnetic bodies 43 alternately to the direction in which the optical adapters 10g are provided side by side can reduce the distance between the optical adapters 10g. Although the hard magnetic bodies 43 are fixed on both sides of the optical adapter 10g to the direction in which the optical adapters 10g are provided side by side in the embodiment described above, the hard magnetic bodies 43 may be disposed on the side of the attachment tool 7. Also, the polarity of the hard magnetic body is not particularly limited as long as the polarities of the adjacent hard magnetic bodies of the optical adapters do not affect each other. That is, the hard magnetic bodies 43 may be fixed either on both sides of the direction in which the optical adapters are disposed side by side, or on both sides of the direction in which the insertion holes of the attachment tool are provided side by side. In such the case, a part of the attachment tool 7 facing the hard magnetic bodies 43 provided on the optical adapter, or a part of the optical adapter facing the hard magnetic bodies 43 provided on the attachment tool 7, is formed of another hard magnetic body or a soft magnetic body, which can be attracted to the hard magnetic body 43.

Fifth Embodiment

Figure 11:
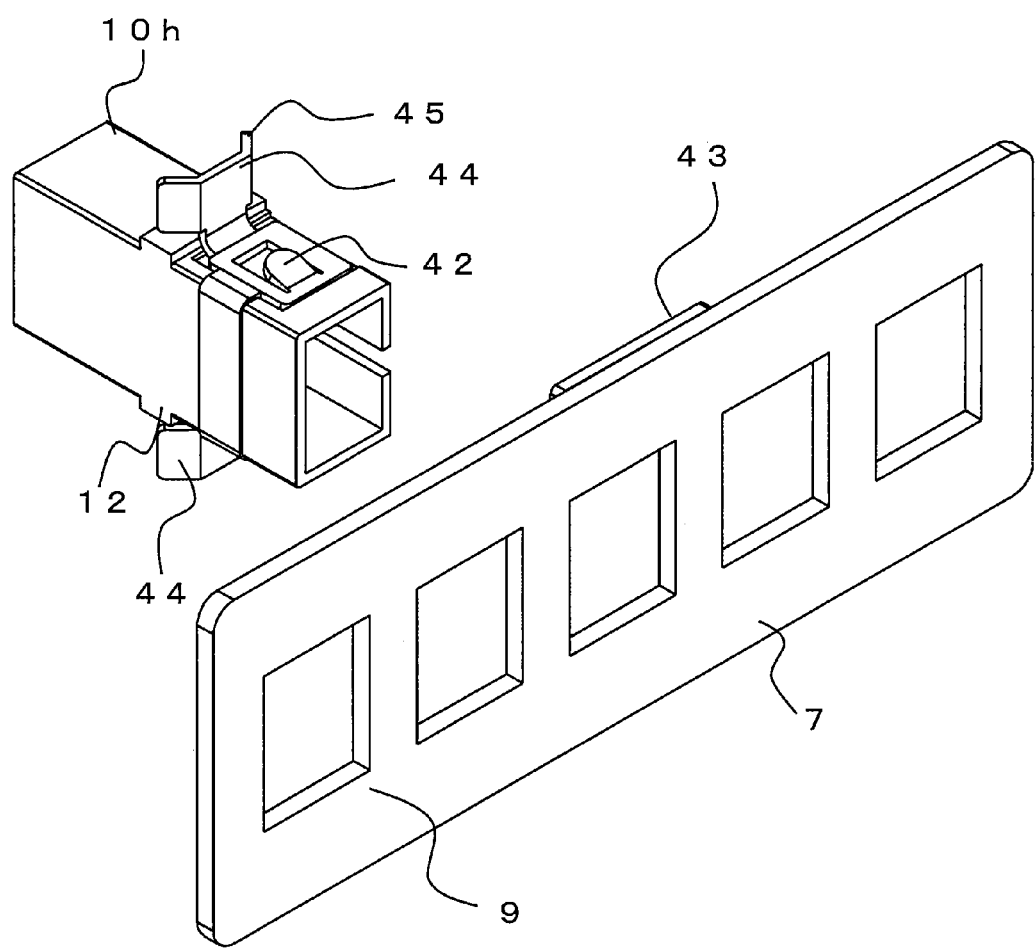
FIG. 11 is a view showing an optical adapter 10h.

Next, a fifth embodiment will be described. FIG. 11 is a view showing an optical adapter 10h according to the fifth embodiment. The optical adapter 10h has an adherend 44 provided on each of upper and lower faces of the optical adapter 10h (i.e., both faces of a main body of the optical adapter, facing each other). The adherend 44 has both a spring property and a soft magnetic property, and is made of steel, for example. Also, the adherend 44 has a thickness that is thick enough to generate an attractive force that can attach and detach the hard magnetic body 43, and thus the adherend 44 is formed of SK steel material or the like having a thickness that is approximately half or less of the plate thickness of the attachment tool 7. The adherends 44 are disposed so as to protrude vertically from the optical adapter 10h, and thus there is no need to provide the protruding portions 12 on the main body of the optical adapter 10h, and the adherends 44 themselves can function as the protruding portions.

Also, the locking piece 42 is formed facing the adherend 44 at a position away from the adherend 44 (i.e., the part functioning as the protruding portion) on each of the upper and lower faces of the optical adapter 10h. The locking piece 42 has the same structure as the one in the optical adapter 10a and the like. That is, by only inserting the optical adapter 10h attached with the locking pieces 42 into the insertion hole 9, the edge portion of the insertion hole 9 is placed between the adherend 44 and the locking piece 42, and thus the optical adapter holding structure in which the optical adapter 10h is attached to the attachment tool 7 can be obtained. The locking pieces 42 and the adherends 44 may be formed as one body from a metal plate Both end portions in a width direction of the adherend 44 are bent in directions separating away from the locking piece 42 (the hard magnetic body 43). That is, a center portion of the width direction of the adherend 44 is formed approximately flat and approximately parallel to the hard magnetic body 43, and the both end portions of the width direction are diagonally bent (or curved) backward at bending portions 45. An angle of bending at the bending portion 45 is to be the maximum tolerable swaying angle of the optical adapter 10h.

The hard magnetic body 43 is fixed onto a part of the attachment tool 7 facing the adherend 44. The hard magnetic body 43 is attached to the attachment tool 7, which is made of a soft magnetic body, by means of a magnetic force. In the present embodiment, the protruding portion of the optical adapter 10h facing the hard magnetic body 43 is formed of the adherend 44, which can be attracted to the hard magnetic body 43. At this time, the thickness of the adherend 44 is sufficiently smaller than the thickness of the attachment tool 7, and thus the attractive force between the hard magnetic body 43 and the adherend 44 is smaller than the attractive force between the hard magnetic body 43 and the attachment tool 7.

In a state in which the optical adapter 10h is attached to the attachment tool 7, the hard magnetic body 43 and the adherend 44 (the flat portion at the approximate center of the adherend 44) are attracted each other, thereby maintaining an approximately vertical posture of the optical adapter 10h. At this time, there is a certain clearance formed between the locking piece 42 and the attachment tool 7 so that the optical adapter 10h can sway.

When an optical connector is inserted into the optical adapter 10h from a side of the locking piece 42 of the optical adapter 10h (from the front side in the drawing) in this state, a force is applied toward the rear side of the optical adapter 10h (the back side in the drawing) due to a force applied at the time of inserting the optical connector. At this time, if an insertion force (an insertion resistance) of the optical connector is larger than the attractive force between the hard magnetic body 43 and the adherend 44 (the substantially parallel flat portion at the approximate center of the adherend 44), separation between the hard magnetic body 43 and the adherend 44 occurs before the optical connector is completely inserted into the optical adapter 10h.

For example, if the attractive force between the hard magnetic body 43 and the adherend 44 (the flat parallel portion at the approximate center of the adherend 44) is smaller than the insertion force of 7N to 9 N required for fitting a common optical connector into an optical adapter, the hard magnetic body 43 separates away from the adherend 44. Even in such the case, the locking pieces 42 prevent the optical adapter 10h from falling out of the attachment tool 7. However, there is a possibility that the operator mistakes a separating feel between the hard magnetic body 43 and the adherend 44 as a fitting feel between the optical connector and the optical adapter 10h. For example, the operator may stop inserting the optical connector before the optical connector is completely fitted into the optical adapter 10h, and this may lead to a so-called half-insertion state of the connector.

One way to prevent such the half-insertion state is to make the attractive force of a magnetic force between the hard magnetic body 43 and the adherend 44 greater than the insertion force of 7 to 9 N, which is required to fit the optical connector into the optical adapter. However, with a simple method such as increasing the magnetic force of the hard magnetic body 43, increasing the plate thickness of the adherend 44, or making an area of attraction greater, etc., a moment required to sway the optical adapter is also increased in proportion to the attractive force between the two. In particular, when plugging or unplugging an optical connector to one of optical adapters that are packaged densely, it is necessary to sway the adjacent optical adapters and to make space for the fingers to plug/unplug the optical connector. However, if the force required for swaying the optical adapters is increased, such operability may be deteriorated. Thus, it is preferable to keep the attractive force between the hard magnetic body 43 and the adherend face of the adherend 44 more than 7 to 9 N, while still suppressing the moment required for the optical adapter to start swaying 0.05 Nm or less, at which the optical adapter can sway easily.

Then, in the optical adapter 10h, the adherend 44 is provided with the bending portions 45 to make the adherend 44 to have the most suitable shape. This enables the swaying starting moment to be 0.05 Nm or less, even if a neodymium magnet having a high surface magnetic flux density is used as the hard magnetic body 43 and the attractive force is greater than 7 to 9 N, for example. This will be described in detail hereafter using working examples.

Working Examples

Figure 12:
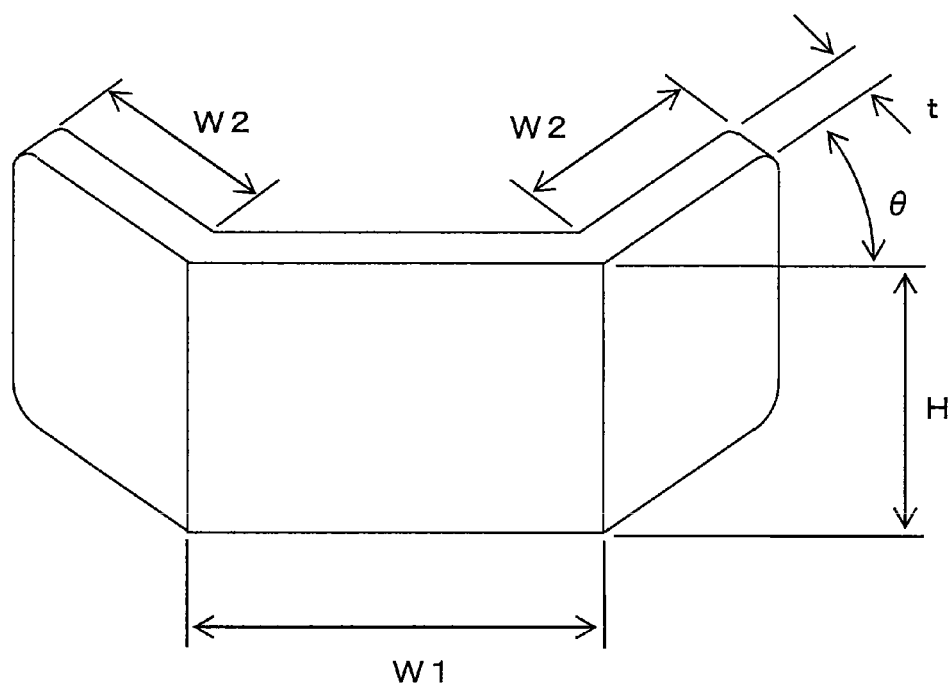
FIG. 12 is a view showing measurements of parts of an adherend.

A relationship between the attractive force between the hard magnetic body and the adherend and the optical adapter swaying starting moment is evaluated by changing the shape of the adherend. FIG. 12 shows measurements of parts of the adherend. A plate material made of SK5 having a thickness t of 0.7 mm, a height H of 5 mm, and an overall width (W1+2×W2) of 13 mm is used as the adherend. The plate material is bent as shown in FIG. 12 (with a bending angle θ=20°), and a width of each of bent portions is W2. That is, a width W1 of a part of the adherend opposing the hard magnetic body (a flat portion in the middle) is 13−2×W2 mm.

Figure 13:
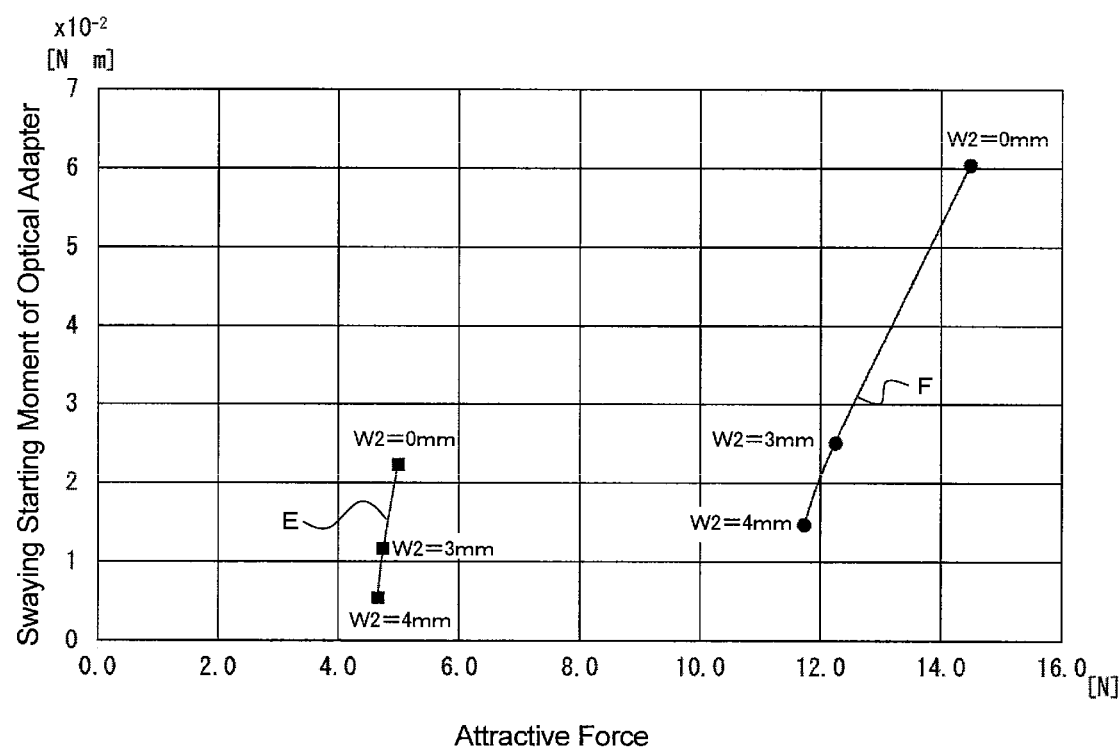
FIG. 13 is a graph showing a relationship between an attractive force between the optical adapter and the attachment tool, a moment required for tilting the optical adapter, and a bending position of an adherend.

As the hard magnetic body, neodymium magnets each having a surface magnetic flux density of 310 mT and 150 mT, respectively, and the same area are used. An optical adapter attached with the adherend (the optical adapter 10h shown in FIG. 11) is attached to an attachment tool and an external force is applied in a width direction of the optical adapter. Then, a threshold attractive force at which the hard magnetic body separates away from the adherend and a moment at which the adapter starts swaying are evaluated. The results are shown in FIG. 13. E in the graph shows the results where the hard magnetic body with the surface magnetic flux density of 150 mT is used, and F in the graph shows the results where the hard magnetic body with the surface magnetic flux density of 310 mT is used. Also, "W2=0 mm" is for a case in which there is no bent portion formed.

From the results, it is found out that the attractive force can be 7 to 9 N or more and the swaying starting moment can be 0.05 Nm or less when the hard magnetic body having the surface magnetic flux density of 310 mT is used and the bent portions are closer to a center of the width as W2=3 mm, 4 mm, and so on. As above, forming the bent portions can satisfy the requirements of both the attractive force and the swaying starting moment.

Next, an application example in which the above-mentioned swaying mechanisms are used will be described. First, the optical adapter shown in FIG. 11 is fitted to the attachment tool and a connector-attached cord is attached to the optical adapter. In this state, if the cord is pulled at a position approximately 15 cm behind a connector portion of the connector-attached cord toward a direction in which the optical adapter can sway, the optical cord gradually bends, decreasing a bending radius thereof. When a certain force pulls the optical cord, the optical adapter starts to sway. That is, facing faces between the hard magnetic body and the adherend separate away. A radius of curvature of the cord bending at the rear side of the optical connector at this time is measured. That is, the connector-attached cord is inserted into the optical adapter and a force is applied to the optical cord in a direction vertical to an optical axis of the optical adapter (i.e., in a swaying direction of the optical adapter), and a bending radius of the optical cord at this time is evaluated.

Figure 14:
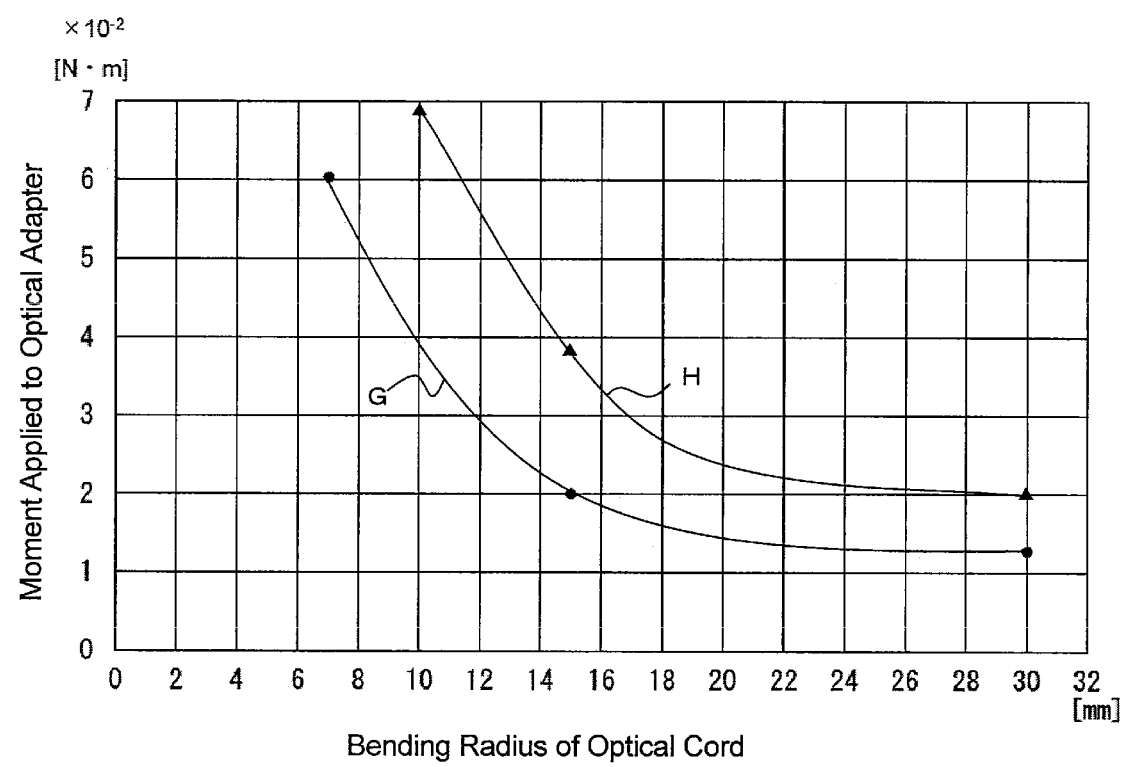
FIG. 14 is a graph showing a relationship between the bending radius of the cord in the proximity of an optical connector and a moment required to tilt the optical adapter.

FIG. 14 is a graph showing a relationship between the bending radius of the optical cord and a moment applied to the optical adapter. G in the drawing shows the optical cord of 1.5φ and H in the drawing shows the optical cord of 2.0φ. A tolerable radius of curvature of a general use connector-attached cord is between 15 mm and 30 mm. From the results, for the 1.5φ optical cord, the moment generated on the optical adapter is approximately 0.012 Nm when the bending radius of the optical cord is 30 mm, and approximately 0.02 Nm when the bending radius of the optical cord is 15 mm. For the 2.0φ optical cord, the moment generated on the optical adapter is approximately 0.02 Nm when the bending radius of the optical cord is 30 mm, and approximately 0.038 Nm when the bending radius of the optical cord is 15 mm.

From the results, by setting the swaying starting moment of the optical adapter to be 0.02 Nm, for example, and seeing if the optical adapter is swaying or not, it is possible to check if the bending radius of the optical cord is 15 mm or more. It has been conventionally necessary to check each optical cord at the rear of the optical connector to see if a bending portion thereof has the tolerable radius of curvature or more. However, as above, it is possible to know that the optical cord has the bending radius of a certain value or more just by checking if there is a tilting of the optical adapter or not.

That is, a method for checking a bending radius of an optical cable that is connected to the optical adapter holding structure of the present working example is as follows: firstly, the relationship between the moment applied to the optical adapter and the bending radius of the optical cable at the time of applying a force to the optical cable connected to the optical adapter is obtained in advance; the swaying starting moment of the swaying mechanism is also checked in advance; when the optical connector is connected to the optical adapter, by checking that all the optical adapters are not swaying and are kept in the normal state, it is possible to know that the moment applied to the optical adapter is equal to or less than the swaying starting moment; and, for this reason, the moment applied to the optical adapter is equal to or less than the certain value, and thus the bending radius of the optical cable is equal to or more than the certain radius.

As above, according to the present method, only by checking if the adjacent optical adapters are parallel to each other or not, it is possible to determine easily whether a wiring condition of the optical cable is good or bad. Also, even if the optical cord is wired with a bending radius lower than the tolerable radius of curvature, the optical adapter and the cord can sway in a direction that can relief the radius of curvature, thereby reducing the optical effects.

Although the preferred embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

Figure 15:
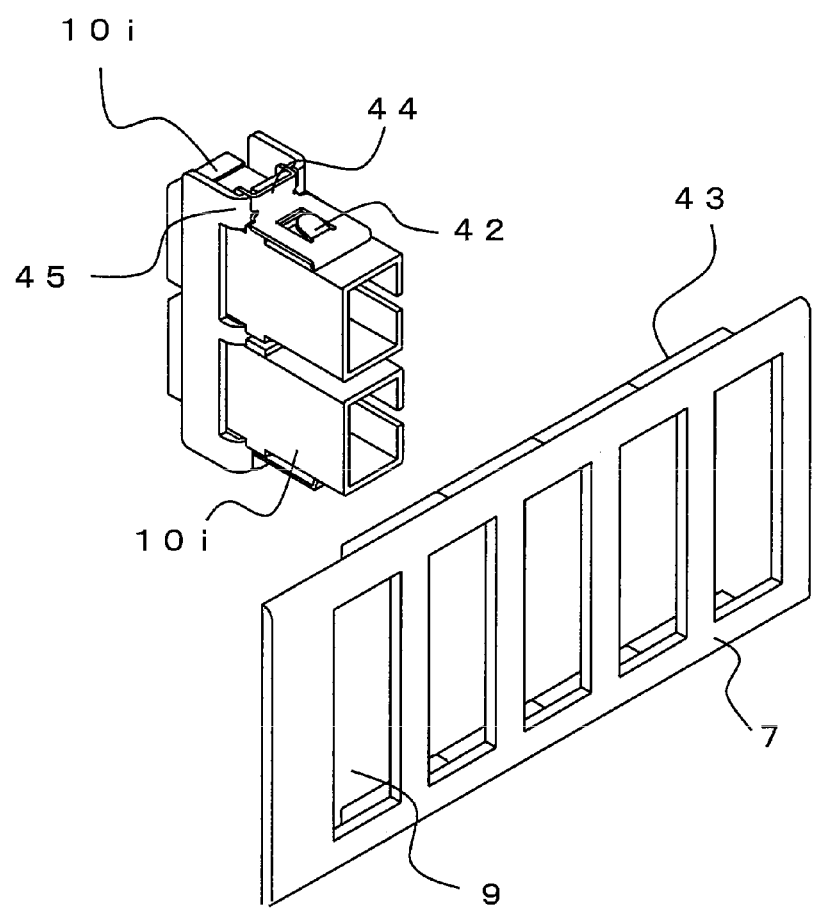
FIG. 15 is a view showing another embodiment of an optical adapter fixing structure.
Figure 16:
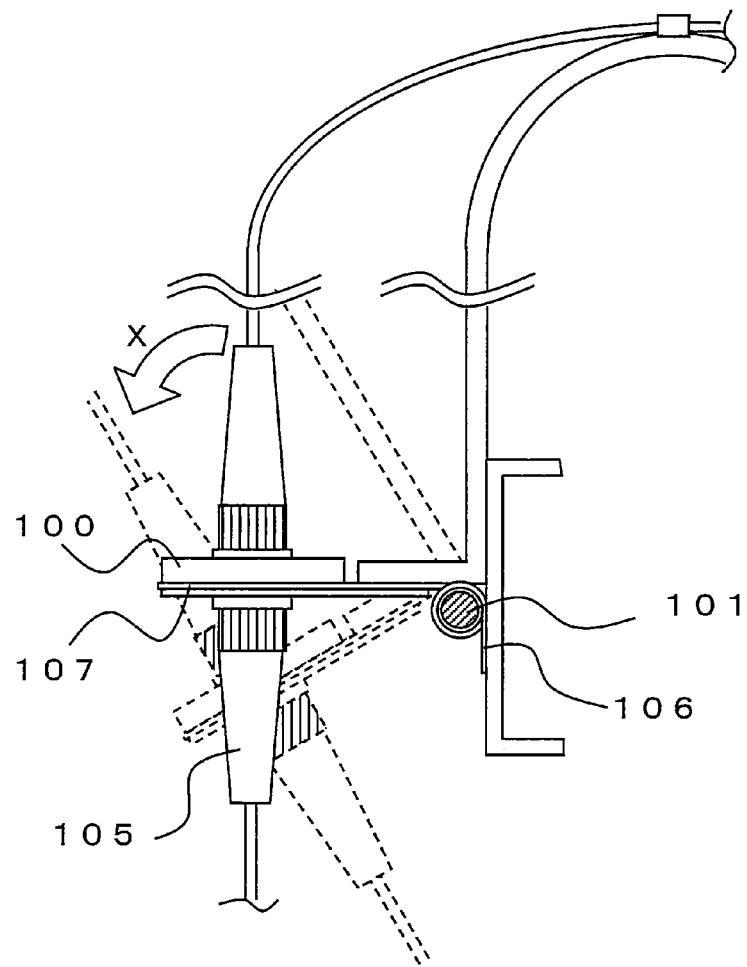
FIG. 16 is a view showing a conventional optical adapter fixing structure.
Figure 17:
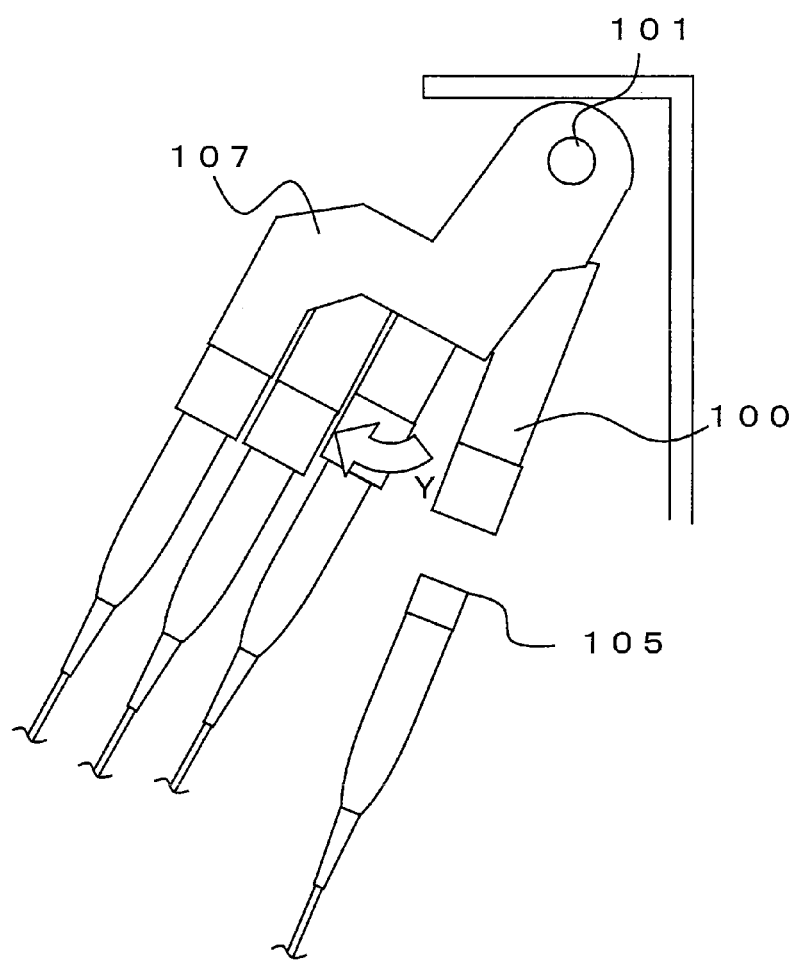
FIG. 17 is a view showing another conventional optical adapter fixing structure.

For example, instead of forming a swaying mechanism for each optical adapter, a plurality of optical adapters may sway collectively. FIG. 15 is a view showing a structure in which a plurality of optical adapters 10i are arranged in a line in a direction orthogonal to the swaying direction so that the optical adapters 10i can be handled collectively.

FIG. 15 illustrates an example of a swaying mechanism using, similarly to FIG. 11, the adherend 44 with the bending portions 45 and the hard magnetic bodies 43. In the illustrated example, a joint member that joins the plurality of optical adapters 10i is made of metal, and the locking piece 42, the adherend 44, and so on are configured as one body with the joint member. Even in such the case, the adjacent optical adapters neighboring in the swaying direction can sway individually. As above, the plurality of the optical adapters may be joined in a direction vertical to the swaying direction so as to sway collectively. Any of the swaying mechanisms of the above-mentioned embodiments is applicable for the swaying mechanism for collectively swaying the plurality of optical adapters.

What is claimed is:

1. An optical adapter holding structure comprising:
    an attachment tool having a plurality of insertion holes that are provided side by side;
    optical adapters, each of the optical adapters being fitted into one of the plurality of insertion holes; and
    a swaying mechanism that allows the optical adapters to sway against the attachment tool, wherein
    when a force greater than a certain value is applied to adjacent optical adapters which are adjacent to any one of the optical adapters, the swaying mechanism allows the adjacent optical adapters to sway in a direction in which the optical adapters are provided side by side, and when the force is offloaded, the swaying mechanism can hold the adjacent optical adapters in a direction substantially vertical to the attachment tool due to a balance between forces in the swaying mechanism.

2. The optical adapter holding structure according to claim 1, wherein
    each of the optical adapters includes a protruding portion that protrudes from each of outer face sides of each of the optical adapters, the outer face sides being orthogonal to the direction in which the optical adapters are provided side by side, and the swaying mechanism allows the optical adapters to sway with proximity of the protruding portion as a base.

3. The optical adapter holding structure according to claim 1, wherein
    hard magnetic bodies are fixed on each side of the direction in which the optical adapters are provided side by side, or on each side of a direction in which the insertion holes of the attachment tool are provided side by side;
    a part of the attachment tool facing the hard magnetic bodies provided on the optical adapter, or a part of the optical adapters facing the hard magnetic bodies provided on the attachment tool, is formed of another hard magnetic body or a soft magnetic body that can be attracted to the hard magnetic bodies;
    an attractive force of the hard magnetic bodies can hold the optical adapters in the direction substantially vertical to the attachment tool when each of the optical adapters is inserted into the insertion hole, and when each of the optical adapters receives a force greater than the attractive force of the hard magnetic bodies, one of the hard magnetic bodies separates away from a facing face so that each of the optical adapters can sway.

4. A method for plugging or unplugging an optical connector to or from the optical adapter holding structure according to claim 1, the method comprising:
    when plugging or unplugging the optical connector to or from any one optical adapter of the optical adapters, swaying the other optical adapters that are adjacent to the one optical adapter in a direction in which the optical adapters are provided side by side by using the swaying mechanism to create a space around the one optical adapter; and
    returning the other optical adapters to original positions by using the swaying mechanism after the plugging or unplugging operation is completed.

5. A method for checking a bending radius of an optical cable that is connected to the optical adapter holding structure according to claim 1, the method comprising:
    acquiring in advance a swaying starting moment of the swaying mechanism;
    acquiring in advance a relationship between a moment applied to each of the optical adapters and a bending radius of the optical cable at the time of applying a force to the optical cable connected to each of the optical adapters;
    making sure that the moment applied to each of the optical adapters is equal to or less than the swaying starting moment by checking that all the optical adapters are not swaying and are kept in a normal state; and
    knowing that the bending radius of the optical cable is equal to or more than a certain radius since the moment applied to each of the optical adapters is equal to or less than a certain moment.

* * * * *

UNITED STATES PATENT AND TRADEMARK OFFICE
CERTIFICATE OF CORRECTION

PATENT NO. : 11,934,016 B2
APPLICATION NO. : 17/745297
DATED : March 19, 2024
INVENTOR(S) : Yoshihito Tamakawa et al.

It is certified that error appears in the above-identified patent and that said Letters Patent is hereby corrected as shown below:

On the Title Page

Item (12) delete "Yoshihito et al" and insert -- Tamakawa et al. --.

Item (72) Inventor is corrected to read:
-- Yoshihito Tamakawa, Tokyo (JP);
Muthukumarana Wedikkara
Arachchilage Chanaka Sudheera, Tokyo (JP) --.

Signed and Sealed this
Twenty-ninth Day of October, 2024

Katherine Kelly Vidal
*Director of the United States Patent and Trademark Office*